US010703172B2

(12) United States Patent
Makihara et al.

(10) Patent No.: US 10,703,172 B2
(45) Date of Patent: Jul. 7, 2020

(54) VEHICULAR HEAT MANAGEMENT SYSTEM

(71) Applicant: DENSO CORPORATION, Kariya, Aichi-pref. (JP)

(72) Inventors: Masamichi Makihara, Kariya (JP); Norihiko Enomoto, Kariya (JP); Yoshiki Katoh, Kariya (JP); Kazutoshi Kuwayama, Kariya (JP); Nobuharu Kakehashi, Kariya (JP)

(73) Assignee: DENSO CORPORATION, Kariya, Aichi-pref. (JP)

(*) Notice: Subject to any disclaimer, the term of this patent is extended or adjusted under 35 U.S.C. 154(b) by 1199 days.

(21) Appl. No.: 14/907,829

(22) PCT Filed: Jul. 16, 2014

(86) PCT No.: PCT/JP2014/003748
§ 371 (c)(1),
(2) Date: Jan. 27, 2016

(87) PCT Pub. No.: WO2015/015729
PCT Pub. Date: Feb. 5, 2015

(65) Prior Publication Data
US 2016/0167481 A1 Jun. 16, 2016

(30) Foreign Application Priority Data
Jul. 31, 2013 (JP) ................. 2013-158935

(51) Int. Cl.
*B60H 1/03* (2006.01)
*B60K 11/02* (2006.01)
*B60H 1/00* (2006.01)

(52) U.S. Cl.
CPC ........... *B60H 1/03* (2013.01); *B60H 1/00485* (2013.01); *B60K 11/02* (2013.01)

(58) Field of Classification Search
CPC ....... B60H 1/03; B60H 1/00485; B60K 11/02
(Continued)

(56) References Cited

U.S. PATENT DOCUMENTS

2003/0127528 A1 7/2003 Sabhapathy et al.
2004/0050089 A1* 3/2004 Amaral .............. B60H 1/00464
62/324.1
(Continued)

FOREIGN PATENT DOCUMENTS

JP 2003262127 A 9/2003
JP 2006335281 A 12/2006
(Continued)

OTHER PUBLICATIONS

International Search Report and Written Opinion (in Japanese with English Translation) for PCT/JP2014/003748, dated Sep. 16, 2014; ISA/JP.

*Primary Examiner* — Avinash A Savani
*Assistant Examiner* — Deepak A Deean
(74) *Attorney, Agent, or Firm* — Harness, Dickey & Pierce, P.L.C.

(57) ABSTRACT

A vehicular heat management system has a first valve body, a second valve body, a third valve body, and a fourth valve body. The first valve body switches a state that the heating medium discharged from the first pump flows in and a state that the heating medium discharged from the first pump does not flow in, with respect to the more than or equal to three of heating medium passing device. The second valve body switches a state that the heating medium discharged from the second pump flows in and a state that the heating medium discharged from the second pump does not flow in, with respect to the more than or equal to three of heating medium passing device. The third valve body switches a state that the heating medium flows to the first pump and a state that the heating medium does not flow to the first pump, with respect (Continued)

to the more than or equal to three of heating medium passing device. The fourth valve body switches a state that the heating medium flows to the second pump and a state that the heating medium does not flow to the second pump, with respect to the more than or equal to three of heating medium passing device.

14 Claims, 14 Drawing Sheets

(58) Field of Classification Search
USPC .......................................................... 165/202
See application file for complete search history.

(56) References Cited

U.S. PATENT DOCUMENTS

| | | | |
|---|---|---|---|
| 2013/0061627 A1* | 3/2013 | Neumeister | B60L 1/003 62/467 |
| 2014/0374081 A1 | 12/2014 | Kakehashi et al. | |
| 2015/0000327 A1 | 1/2015 | Kakehashi et al. | |
| 2015/0101789 A1* | 4/2015 | Enomoto | B60H 1/00485 165/202 |

FOREIGN PATENT DOCUMENTS

| | | | |
|---|---|---|---|
| JP | 2013060190 A | 4/2013 |
| JP | 2013230805 A | 11/2013 |
| JP | 2013231574 A | 11/2013 |

\* cited by examiner

VEHICULAR HEAT MANAGEMENT SYSTEM

CROSS REFERENCE TO RELATED APPLICATIONS

This application is a U.S. National Phase Application under 35 U.S.C. 371 of International Application No. PCT/JP2014/003748 filed on Jul. 16, 2014 and published in Japanese as WO 2015/015729 A1 on Feb. 5, 2015. This application is based on and claims the benefit of priority from Japanese Patent Application No. 2013-158935 filed on Jul. 31, 2013. The entire disclosures of all of the above applications are incorporated herein by reference.

TECHNICAL FIELD

The present disclosure relates to a vehicular heat management system used for a vehicle.

BACKGROUND ART

Conventionally, as described in Patent Literature 1, an apparatus for adjusting temperatures of plural components of a vehicle is known. This conventional apparatus includes two coolant paths. A high-temperature side heat exchanger is arranged in one of the two coolant paths, whereas a low-temperature side heat exchanger is arranged in the other.

In a coolant return path, a multi-way valve that includes a branch section connected to path of the two coolant paths is disposed for respective components of which the temperature should be adjusted. That is, the same quantity of the multi-way valves as the quantity of the components of which temperature should be adjusted are arranged in the coolant return path.

According to this background art, the multi-way valve can switch between a state that a high-temperature coolant circulates and a state that a low-temperature coolant circulates, with respect to components of which temperature should be adjusted.

PRIOR ART LITERATURES

Patent Literature

Patent Literature 1: JP 2013-60190 A

SUMMARY OF INVENTION

According to investigation conducted by the inventors of the subject application, the multi-way valves, of which quantity is the same as a quantity of the components of which temperature should be adjusted, are arranged in the coolant return path. Thus, a quantity of the multi-way valves increases as increasing a quantity of the components of which temperature should be adjusted, and a configuration may become complicated.

In view of the above point, it is an objective of the present disclosure to provide a vehicular heat management system that can switch heating mediums circulating through plural devices by a simple configuration.

To achieve the above objective, a vehicular heat management system has a first pump, a second pump, more than or equal to three of heating medium passing device, and a switching section. The first pump and the second pump draw and discharge a heating medium. The heating medium flows in the more than or equal to three of heating medium passing device. The switching section switches a flow of the heating medium with respect to the more than or equal to three of heating medium passing device. The switching section has a first valve body, a second valve body, a third valve body, and a fourth valve body. The first valve body switches a state that the heating medium discharged from the first pump flows in and a state that the heating medium discharged from the first pump does not flow in, with respect to the more than or equal to three of heating medium passing device. The second valve body switches a state that the heating medium discharged from the second pump flows in and a state that the heating medium discharged from the second pump does not flow in, with respect to the more than or equal to three of heating medium passing device. The third valve body switches a state that the heating medium flows to the first pump and a state that the heating medium does not flow to the first pump, with respect to the more than or equal to three of heating medium passing device. The fourth valve body switches a state that the heating medium flows to the second pump and a state that the heating medium does not flow to the second pump, with respect to the more than or equal to three of heating medium passing device.

According to the above-described features, the heating medium that circulates through the more than or equal to three of heating medium passing device can be switched by using the four valve bodies. Thus, even when a quantity of the heating medium passing device increases, a quantity of the valve bodies is unnecessary to increase. Therefore, a configuration can be simplified.

DESCRIPTION OF EMBODIMENTS

Embodiments of the present disclosure will be described hereafter referring to drawings. In the embodiments, a part that corresponds to a matter described in a preceding embodiment may be assigned with the same reference number.

First Embodiment

Figure 1:
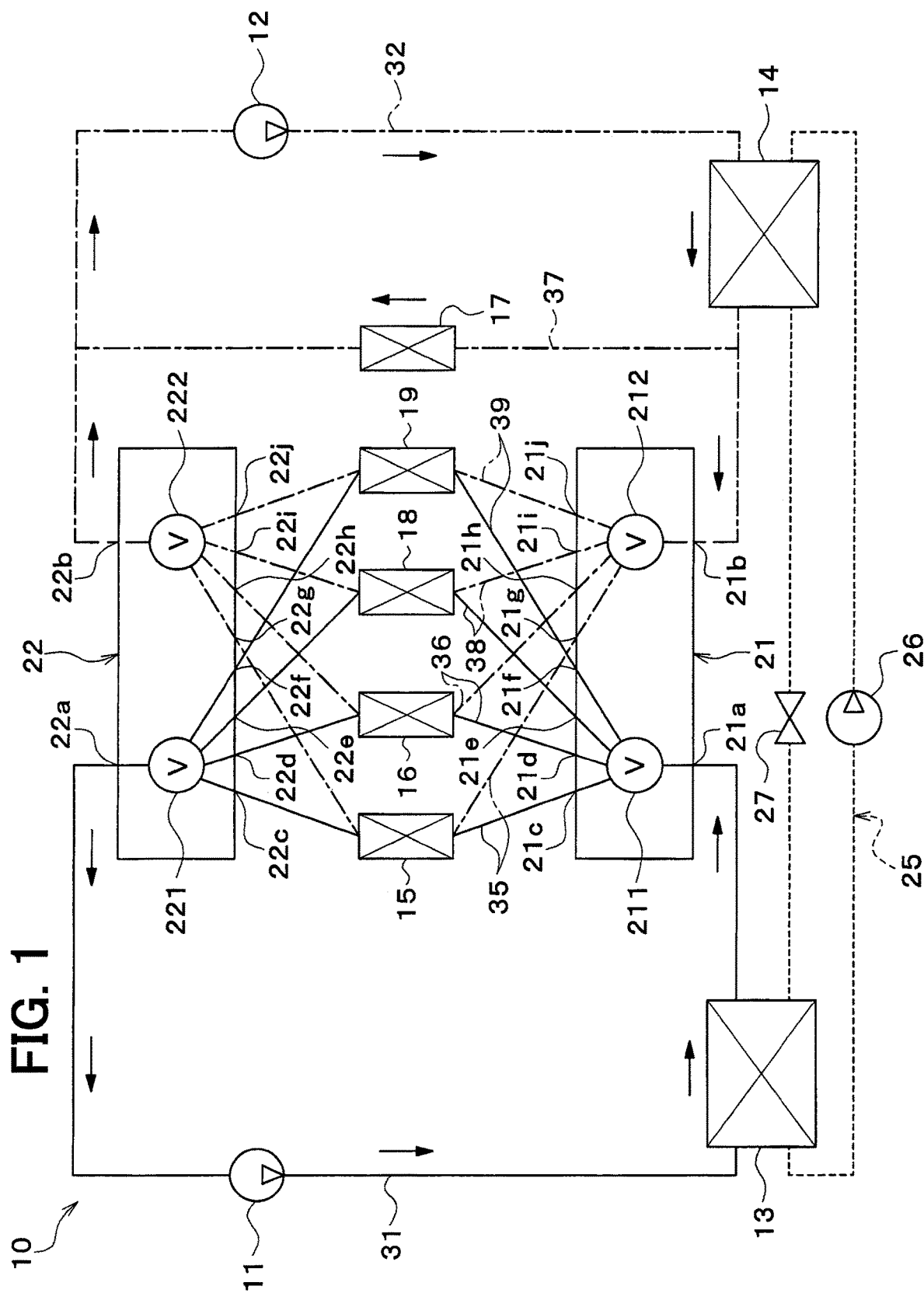
FIG. 1 is an overall configuration diagram illustrating a vehicular heat management system of a first embodiment.

A vehicular heat management system 10 shown in FIG. 1 is used to adjust various types of device provided in a vehicle and a vehicle cabin at an appropriate temperature. In this embodiment, the vehicular heat management system 10 is applied to a hybrid vehicle that obtains drive power for running the vehicle from an engine (i.e., an internal combustion engine) and an electric motor for travel or to an electric vehicle that obtains the drive power for running the vehicle from the electric motor for travel.

The hybrid vehicle or the electric vehicle of this embodiment can store electric power supplied from an external power source (i.e., a commercial power source) during parking of the vehicle in a cell that is mounted in the vehicle (i.e., an onboard battery). A lithium-ion cell can be used as the cell, for example.

The drive power output from the engine is used not only for running the vehicle but is also used to actuate a generator. The hybrid vehicle or the electric vehicle can store the electric power generated by the generator and the electric power supplied from the external power source in the cell. The electric power stored in the cell is supplied not only to the electric motor for travel but also to various types of onboard device including electrically-configured device that constitutes the vehicular heat management system 10.

As shown in FIG. 1, the vehicular heat management system 10 includes a first pump 11, a second pump 12, coolant passing device 13, 14, 15, 16, 17, 18, 19, a first switching valve 21, and a second switching valve 22.

The first pump 11 and the second pump 12 are an electric pump that suctions and discharges a coolant (i.e., a heating medium). The coolant is a fluid as the heating medium. In this embodiment, a liquid that at least contains ethylene glycol, dimethyl polysiloxane, or a nano fluid, or an anti-freeze liquid is used as the coolant.

The coolant passing devices 13, 14, 15, 16, 17, 18, 19 is a device (i.e., heating medium passing device) in which the coolant flows. In this embodiment, the coolant passing device 13, 14, 15, 16, 17, 18, 19 is a coolant cooler 13, a coolant heater 14, a cooler core 15, a cell temperature adjuster 16, a heater core 17, an inverter temperature adjuster 18, and a radiator 19.

The coolant cooler 13 is a cooler that cools the coolant by exchanging heat between a low-pressure side refrigerant in a refrigeration cycle 25 and the coolant. A coolant inlet side (i.e., a heating medium inlet side) of the coolant cooler 13 is connected to a coolant discharge side (i.e., a heating medium discharge side) of the first pump 11.

The coolant heater 14 is a heater that heats the coolant by exchanging heat between a high-pressure side refrigerant in the refrigeration cycle 25 and the coolant. A coolant inlet side (i.e., a heating medium inlet side) of the coolant heater 14 is connected to a coolant discharge side (i.e., a heating medium discharge side) of the second pump 12.

The refrigeration cycle 25 is a vapor-compression-type refrigerator that includes a compressor 26, the coolant heater 14, an expansion valve 27, and the coolant cooler 13. In the refrigeration cycle 25 of this embodiment, a chlorofluorocarbon-based refrigerant is used as the refrigerant, and a subcritical refrigeration cycle in which pressure of the high-pressure side refrigerant does not exceed critical pressure of the refrigerant is configured.

The compressor 26 is an electric compressor that is driven by the electric power supplied from the cell, and suctions, compresses, and discharges the refrigerant in the refrigeration cycle 25. The compressor 26 may be driven by the power generated by the engine.

The coolant heater 14 is a condenser that condenses the high-pressure side refrigerant by exchanging heat between the high-pressure side refrigerant discharged from the compressor 26 and the coolant. The expansion valve 27 is a pressure reduction section that decompresses and expands a liquid-phase refrigerant flowing from the coolant heater 14.

The coolant cooler 13 is an evaporator that evaporates a low-pressure refrigerant of pressure is reduced and which is expanded by the expansion valve 27, by exchanging heat between the low-pressure refrigerant and the coolant. A gas-phase refrigerant evaporated in the coolant cooler 13 is suctioned into and compressed by the compressor 26.

The coolant cooler 13 cools the coolant by using the low-pressure refrigerant in the refrigeration cycle 25, and thus can cool the coolant to a temperature that is lower than a temperature of outside air.

The radiator 19 is a heat exchanger (i.e., a heating medium/outside air heat exchanger, a heating medium/air heat exchanger) that exchanges heat between the coolant and the outside air (i.e., vehicle cabin outside air). The radiator 19 functions as heat radiation device that radiates heat of the coolant to the outside air when the coolant temperature is higher than the outside air temperature, and functions as heat absorption device that makes the coolant absorbs heat of the outside air when the coolant temperature is lower than the outside air temperature.

The outside air is delivered to the radiator 19 by an outdoor blower (not shown). The outdoor blower is a blower that delivers the outside air to the radiator 19 and is constructed of an electric blower. The radiator 19 and the outdoor blower are arranged in a forefront of the vehicle. Thus, the radiator 19 can be exposed to a travel wind during a travel of the vehicle.

The radiator 19 cools the coolant by the outside air, and thus can cool the coolant to the outside air temperature.

The cooler core 15 is an air cooling heat exchanger (i.e., an air cooler) that cools the air to be delivered into the vehicle cabin by exchanging heat between the coolant and the air to be delivered into the vehicle cabin. Thus, the coolant that is cooled by the coolant cooler 13, device for generating cold heat, or the like is required to flow in the cooler core 15.

The heater core 17 is an air heating heat exchanger (i.e., an air heater) that heats the air to be delivered into the vehicle cabin by exchanging heat between the coolant and the air to be delivered into the vehicle cabin. Thus, the coolant that is heated by the coolant heater 14, device for generating warm heat, or the like is required to flow in the heater core 17.

Inside air (i.e., the air in the vehicle cabin), the outside air, or mixed air of the inside air and the outside air is delivered to the cooler core 15 and the heater core 17 by an indoor blower (not shown). The indoor blower is a blower that delivers the air to the cooler core 15 and the heater core 17 and is constructed of an electric blower.

The cooler core 15, the heater core 17, and the indoor blower are housed in a casing (not shown) of an indoor air-conditioning unit (not shown) of a vehicular air conditioner. The indoor air-conditioning unit is arranged on the inside of a dashboard (i.e., an instrument panel) at the forefront on the inside of the vehicle cabin. The casing forms an outer shell of the indoor air-conditioning unit.

The casing forms an air passage for the air to be delivered into the vehicle cabin, and is molded of a resin (e.g., polypropylene) that has a certain degree of elasticity and superior strength.

An inside/outside air switching device (not shown) is arranged on an uppermost-stream side of a flow of the air to be delivered into the vehicle cabin in the casing. The inside/outside air switch device is an inside/outside air introducing section that switches between and introduces the inside air and the outside air to the casing.

An opening is formed in a downmost-stream portion of the casing in the air flow direction, and conditioned air, of which temperature is after adjusted by the cooler core 15 and the heater core 17, is blown from the opening into the vehicle cabin that is an air conditioning target space.

The cell temperature adjuster 16 and the inverter temperature adjuster 18 are a device (i.e., a temperature adjustment target device) that has a path through which the coolant flows and that transfers heat to/from the coolant.

The cell temperature adjuster 16 may be a heat exchanger (i.e., an air/heating medium heat exchanger) that is arranged in an air delivery passage to the cell and exchanges heat between the air and the coolant.

The inverter temperature adjuster 18 is a heat exchanger that has a path through which the coolant flows on the inside and that exchanges heat between an inverter and the coolant. The inverter is an electric power converter that converts DC power supplied from the cell to AC voltage and outputs the AC voltage to the electric motor for travel.

In addition, other types of the coolant passing device may include the electric motor for travel, engine device, a cold and heat storage body, a ventilation heat recovery heat exchanger, and a coolant/coolant heat exchanger.

The engine device includes a turbocharger, an intercooler, an EGR cooler, a CVT warmer, a CVT cooler, an exhaust heat recovery device, and the like.

The turbocharger is a supercharger for supercharging the suctioned air (i.e., intake air) of the engine. The intercooler is an intake air cooler (i.e., an intake air/heating medium heat exchanger) that cools the supercharged intake air, which is compressed by the turbocharger and has a high temperature, by exchanging heat between the supercharged intake air and the coolant.

The EGR cooler is an exhaust/coolant heat exchanger (i.e., an exhaust/heating medium heat exchanger) for cooling engine exhaust gas (i.e., exhaust) to be returned to the intake side of the engine by exchanging heat between the exhaust and the coolant.

The CVT warmer is a lubricant/coolant heat exchanger (i.e., a lubricant/heating medium heat exchanger) for heating lubricant (i.e., CVT oil) that lubricates a continuously variable transmission (i.e., CVT) by exchanging heat between the CVT oil and the coolant.

The CVT cooler is a lubricant/coolant heat exchanger (i.e., a lubricant/heating medium heat exchanger) for cooling the CVT oil by exchanging heat between the CVT oil and the coolant.

The exhaust heat recovery device is an exhaust/coolant heat exchanger (i.e., an exhaust/heating medium heat exchanger) that makes the coolant absorb the exhaust heat by exchanging heat between the exhaust and the coolant.

The cold and heat storage body stores warm heat or cold heat of the coolant. A chemical heat storage material, a heat insulating tank, a latent-heat type heat storage body (e.g., paraffin or a hydrate-based material), and the like can be raised as examples of the cold and heat storage body.

The ventilation heat recovery heat exchanger is a heat exchanger that recovers heat (i.e., cold heat or warm heat) discharged to the outside through ventilation. For example, since the ventilation heat recovery heat exchanger recovers heat (i.e., cold heat or warm heat) discharged to the outside through the ventilation, power required for cooling or warming can be reduced.

The coolant/coolant heat exchanger is a heat exchanger that exchanges heat between the coolant and the coolant. For example, the coolant/coolant heat exchanger exchanges heat between the coolant in the vehicular heat management system 10 (i.e., the coolant circulated by the first pump 11 or the second pump 12) and the coolant in an engine cooling circuit (i.e., a circuit through which the coolant for cooling the engine circulates). In this way, heat can be transferred between the vehicular heat management system 10 and the engine cooling circuit.

The first pump 11 is arranged in a first pump path 31. The coolant cooler 13 is arranged on the coolant discharge side of the first pump 11 in the first pump path 31.

The second pump 12 is arranged in a second pump path 32. The coolant heater 14 is arranged on the coolant discharge side of the second pump 12 in the second pump path 32.

The radiator 19 is arranged in a radiator path 39. The cooler core 15 is arranged in a cooler core path 35. The heater core 17 is arranged in a heater core path 37. The cell temperature adjuster 16 is arranged in a cell temperature adjuster path 36. The inverter temperature adjuster 18 is arranged in an inverter temperature adjuster path 38. The first pump path 31, the second pump path 32, the radiator path 39, the cooler core path 35, the cell temperature adjuster path 36, and the inverter temperature adjuster path 38 are connected to the first switching valve 21 and the second switching valve 22.

The first switching valve 21 and the second switching valve 22 are a switching section (i.e., a heating medium flow switching section) switching a flow of the coolant.

The first switching valve 21 is a multi-way valve that has plural ports (i.e., first switching valve ports), path of which constitutes an inlet or an outlet of the coolant. More specifically, the first switching valve 21 has a first inlet 21*a* and a second inlet 21*b* as the inlets of the coolant, and has first to eighth outlets 21*c* to 21*j* as the outlets of the coolant.

The second switching valve 22 is a multi-way valve that has plural ports (i.e., second switching valve ports), path of which constitutes an inlet or an outlet of the coolant. More specifically, the second switching valve 22 has a first outlet 22*a* and a second outlet 22*b* as the outlets of the coolant, and has first to eighth inlets 22*c* to 22*j* as the inlets of the coolant.

One end of the first pump path 31 is connected to the first inlet 21*a* of the first switching valve 21. In other words, a coolant outlet side of the coolant cooler 13 is connected to the first inlet 21*a* of the first switching valve 21.

One end of the second pump path 32 is connected to the second inlet 21*b* of the first switching valve 21. In other words, a coolant outlet side of the coolant heater 14 is connected to the second inlet 21b of the first switching valve 21.

One end of the heater core path 37 is connected to a portion of the second pump path 32 between the coolant heater 14 and the first switching valve 21. In other words, a coolant inlet side of the heater core 17 is connected to the coolant outlet side of the coolant heater 14.

One end of the cooler core path 35 is connected to the first outlet 21c and the fifth outlet 21g of the first switching valve 21. In other words, a coolant inlet side of the cooler core 15 is connected to the first outlet 21c and the fifth outlet 21g of the first switching valve 21.

One end of the cell temperature adjuster path 36 is connected to the second outlet 21d and the sixth outlet 21h of the first switching valve 21. In other words, a coolant inlet side of the cell temperature adjuster 16 is connected to the second outlet 21d and the sixth outlet 21h of the first switching valve 21.

One end of the inverter temperature adjuster path 38 is connected to the third outlet 21e and the seventh outlet 21i of the first switching valve 21. In other words, a coolant inlet side of the inverter temperature adjuster 18 is connected to the third outlet 21e and the seventh outlet 21i of the first switching valve 21.

One end of the radiator path 39 is connected to the fourth outlet 21f and the eighth outlet 21j of the first switching valve 21. In other words, a coolant inlet side of the radiator 19 is connected to the fourth outlet 21f and the eighth outlet 21j of the first switching valve 21.

The other end of the first pump path 31 is connected to the first outlet 22a of the second switching valve 22. In other words, a coolant suction side of the first pump 11 is connected to the first outlet 22a of the second switching valve 22.

The other end of the second pump path 32 is connected to the second outlet 22b of the second switching valve 22. In other words, a coolant suction side of the second pump 12 is connected to the second outlet 22b of the second switching valve 22.

The other end of the heater core path 37 is connected to a portion of the second pump path 32 between the second switching valve 22 and the second pump 12. In other words, a coolant outlet side of the heater core 17 is connected to the coolant suction side of the second pump 12.

The other end of the cooler core path 35 is connected to the first inlet 22c and the fifth inlet 22g of the second switching valve 22. In other words, a coolant outlet side of the cooler core 15 is connected to the first inlet 22c and the fifth inlet 22g of the second switching valve 22.

The other end of the cell temperature adjuster path 36 is connected to the second inlet 22d and the sixth inlet 22h of the second switching valve 22. In other words, a coolant outlet side of the cell temperature adjuster 16 is connected to the second inlet 22d and the sixth inlet 22h of the second switching valve 22.

The other end of the inverter temperature adjuster path 38 is connected to the third inlet 22e and the seventh inlet 22i of the second switching valve 22. In other words, a coolant outlet side of the inverter temperature adjuster 18 is connected to the third inlet 22e and the seventh inlet 22i of the second switching valve 22.

The other end of the radiator path 39 is connected to the fourth inlet 22f and the eighth inlet 22j of the second switching valve 22. In other words, a coolant outlet side of the radiator 19 is connected to the fourth inlet 22f and the eighth inlet 22j of the second switching valve 22.

The first switching valve 21 is structured to be capable of switching a communication state between path of the inlets 21a, 21b and path of the outlets 21c to 21j. The second switching valve 22 is also structured to be capable of switching a communication state between path of the outlets 22a, 22b and path of the inlets 22c to 22j.

More specifically, the first switching valve 21 switches among (i) a state that the coolant discharged from the first pump 11 flows in, (ii) a state that the coolant discharged from the second pump 12 flows in, and (iii) a state that neither the coolant discharged from the first pump 11 nor the coolant discharged from the second pump 12 flows in, with respect to the cooler core 15, the cell temperature adjuster 16, the inverter temperature adjuster 18, and the radiator 19.

The second switching valve 22 switches among a state that the coolant flows to the first pump 11, a state that the coolant flows to the second pump 12, and a state that the coolant flows to neither the first pump 11 nor the second pump 12, with respect to the cooler core 15, the cell temperature adjuster 16, the inverter temperature adjuster 18, and the radiator 19.

The first switching valve 21 is structured to be capable of adjusting an opening degree of path of the outlets 21c to 21j and capable of closing path of the outlets 21c to 21j. The second switching valve 22 is also structured to be capable of adjusting an opening degree of path of the inlets 22c to 22j and capable of closing path of the inlets 22c to 22j.

The first switching valve 21 and the second switching valve 22 have a case that defines an outer shell, and respectively have valve bodies 211, 212, 221, 222 housed in the cases. The inlets and the outlets of the coolant are formed at predetermined positions of the cases, and the communication state between path of the inlets and path of the outlets of the coolant is changed by a rotational operation of path of the valve bodies.

The valve bodies 212, 212 of the first switching valve 21 and the valve bodies 221, 222 of the second switching valve 22 are rotationally and independently driven by separate electric motors. The valve bodies 212, 212 of the first switching valve 21 and the valve bodies 221, 222 of the second switching valve 22 may rotationally be driven in an interlocking manner by a common electric motor.

The first switching valve 21 has the two valve bodies 212, 212. The second switching valve 22 also has the two valve bodies 221, 222. In the following description, the one valve body 221 of the first switching valve 21 is referred to as a first valve body, the other valve body 212 of the first switching valve 21 is referred to as a second valve body, the one valve body 221 of the second switching valve 22 is referred to as a third valve body, and the other valve body 222 of the second switching valve 22 is referred to as a fourth valve body.

The first valve body 211 switches the communication state between the first inlet 21a and path of the first to fourth outlets 21c to 21f. The second valve body 212 switches the communication state between the second inlet 21b and path of the fifth to eighth outlets 21g to 21j.

The first valve body 211 is housed in a valve body chamber that is formed in the case of the first switching valve 21. The second valve body 212 is also housed in a valve body chamber that is formed in the case of the first switching valve 21. The case of the first switching valve 21 is a valve body chamber forming member for forming the valve body chambers.

The case of the first switching valve 21 forms (i) the valve body chamber that houses the first valve body 211 (i.e., the valve body on a side of the first pump 11) and (ii) the valve body chamber that houses the second valve body 212 (i.e., the valve body on a side of the second pump 12) such that the two valve body chambers are formed separately from path other.

The third valve body 221 switches the communication state between the first outlet 22a and path of the first to fourth inlets 22c to 22f. The fourth valve body 222 switches the communication state between the second outlet 22b and path of the fifth to eighth inlets 22g to 22j.

The third valve body 221 is housed in a valve body chamber that is formed in the case of the second switching valve 22. The fourth valve body 222 is also housed in a valve body chamber that is formed in the case of the second switching valve 22. The case of the second switching valve 22 is a valve body chamber forming member for forming the valve body chambers.

The case of the second switching valve 22 forms (i) the valve body chamber that houses the third valve body 221 (i.e., the valve body on a side of the first pump 11) and (ii) the valve body chamber that houses the fourth valve body 222 (i.e., the valve body on a side of the second pump 12) such that the two valve body chambers are formed separately from path other.

Figure 2:
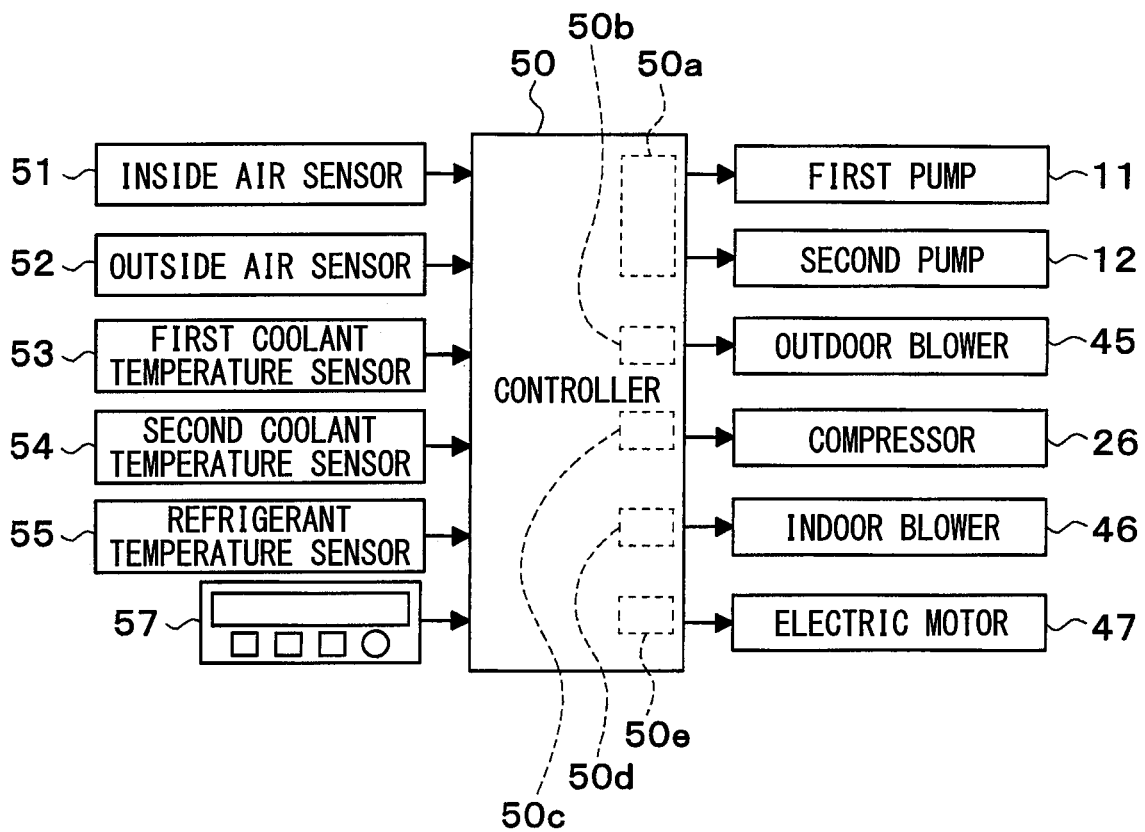
FIG. 2 is a block diagram illustrating an electric control unit of the vehicular heat management system in the first embodiment.

Next, an electric control unit of the vehicular heat management system 10 will be described on the basis of FIG. 2. A controller 50 is constructed of a well-known microcomputer that includes a CPU, a ROM, a RAM, and the like and a peripheral circuit thereof. The controller 50 performs various types of computations and processes on the basis of an air-conditioning control program stored in the ROM thereof and controls actuation of the first pump 11, the second pump 12, an outdoor blower 45, the compressor 26, an indoor blower 46, an electric motor 47 for a switching valve, and the like that are connected to an output side.

The electric motor 47 is a switching valve drive section that drives the valve bodies of the first switching valve 21 and the valve bodies of the second switching valve 22. In this embodiment, the electric motor for driving the valve bodies of the first switching valve 21 and the electric motor for driving the valve bodies of the second switching valve 22 are separately provided as the electric motors 47.

In the controller 50, control units for controlling various types of control target device that are connected to the output side thereof are integrally configured. A configuration (hardware and software) for controlling actuation of path type of the control target device constitutes the control unit for controlling the actuation of path type of the control target device.

In this embodiment, a configuration (hardware and software) for controlling the actuation of the first pump 11 and the second pump 12 is a pump control unit 50a. The pump control unit 50a is a flow control unit that makes the coolant flow. The pump control unit 50a may separately be configured from the controller 50.

In this embodiment, a configuration (hardware and software) for controlling the actuation of the outdoor blower 45 is an outdoor blower control unit 50b (i.e., an air delivery control unit). The outdoor blower control unit 50b may separately be configured from the controller 50.

In this embodiment, a configuration (hardware and software) for controlling the actuation of the compressor 26 is a compressor control unit 50c. The compressor control unit 50c may separately be configured from the controller 50.

In this embodiment, a configuration (hardware and software) for controlling the actuation of the indoor blower 46 is an indoor blower control unit 50d (i.e., an air delivery control unit). The indoor blower control unit 50d may separately be configured from the controller 50.

In this embodiment, a configuration (hardware and software) for controlling the actuation of the electric motors 47 is a switching valve control unit 50e. The switching valve control unit 50e may separately be configured from the controller 50.

Detection signals of sensor groups, such as an inside air sensor 51, an outside air sensor 52, a first coolant temperature sensor 53, a second coolant temperature sensor 54, and a refrigerant temperature sensor 55, are input to an input side of the controller 50.

The inside air sensor 51 is a detector (i.e., an inside air temperature detector) that detects an inside air temperature (i.e., a vehicle cabin inside temperature). The outside air sensor 52 is a detector (i.e., an outside air detector) that detects an outside air temperature (i.e., a vehicle cabin outside temperature).

The first coolant temperature sensor 53 is a detector (i.e., a first heating medium temperature detector) that detects a temperature of the coolant flowing through the first pump path 31 (e.g., a temperature of the coolant flowing out from the coolant cooler 13).

The second coolant temperature sensor 54 is a detector (i.e., a second heating medium temperature detector) that detects a temperature of the coolant flowing through the second pump path 32 (e.g., a temperature of the coolant flowing out from the coolant heater 14).

The refrigerant temperature sensor 55 is a detector (i.e., a refrigerant temperature detector) that detects a temperature of the refrigerant in the refrigeration cycle 25 (e.g., a temperature of the refrigerant discharged from the compressor 26 or the temperature of the coolant flowing out from the coolant cooler 13). The refrigerant temperature sensor 55 may be arranged in the heat exchanger that is arranged in the refrigeration cycle 25.

The inside air temperature, the outside air temperature, the coolant temperatures, and the refrigerant temperature may be estimated on the basis of detection values of various physical quantities.

A refrigerant pressure sensor for detecting a pressure of the refrigerant in the refrigeration cycle 25 (e.g., a pressure of the refrigerant discharged from the compressor 26 or a pressure of the coolant flowing out from the coolant cooler 13) may be arranged instead of the refrigerant temperature sensor 55.

An operation signal from an air conditioner switch 57 is input to the input side of the controller 50. The air conditioner switch 57 is a switch that switches on/off of the air conditioner (i.e., on/off of a cooler) and is arranged near the dashboard in the vehicle cabin.

Next, the actuation in the above configuration will be described. A mode is switched among various actuation modes when the controller 50 controls the actuation of the first pump 11, the second pump 12, the compressor 26, the electric motors 47, and the like.

For example, a first coolant circuit (i.e., a first heating medium circuit) is formed by the first pump path 31 and at least one path of the cooler core path 35, the cell temperature adjuster path 36, the inverter temperature adjuster path 38, and the radiator path 39. Furthermore, a second coolant circuit (i.e., a second heating medium circuit) is formed by the second pump path 32 and at least another path of the cooler core path 35, the cell temperature adjuster path 36, the inverter temperature adjuster path 38, the radiator path 39, and the heater core path 37.

With respect to the cooler core path 35, the cell temperature adjuster path 36, the inverter temperature adjuster path 38, and the radiator path 39, a case of being connected to the first coolant circuit and a case of being connected to the second coolant circuit are switched in accordance with a situation. As a result, the cooler core 15, the cell temperature adjuster 16, the inverter temperature adjuster 18, and the radiator 19 can path be adjusted at an appropriate temperature in accordance with the situation.

When the radiator path 39 is connected to the first coolant circuit, a heat pump operation of the refrigeration cycle 25 can be performed. That is, the coolant cooled in the coolant cooler 13 flows through the radiator 19 in the first coolant circuit. Thus, the coolant absorbs heat from the outside air in the radiator 19.

Then, the coolant absorbed heat from the outside air in the radiator 19 exchanges heat with the refrigerant in the refrigeration cycle 25 and radiates heat in the coolant cooler 13. Thus, in the coolant cooler 13, the refrigerant of the refrigeration cycle 25 absorbs heat from the outside air via the coolant.

The refrigerant absorbed heat from the outside air in the coolant cooler 13 exchanges heat with the coolant of the second coolant circuit and radiates heat in the coolant heater 14. Thus, the heat pump operation for pumping heat of the outside air can be realized.

When the radiator path 39 is connected to the second coolant circuit, the coolant heated in the coolant heater 14 flows through the radiator 19. Thus, the coolant can radiate heat to the outside air in the radiator 19.

When the cooler core path 35 is connected to the first coolant circuit, the coolant cooled in the coolant cooler 13 flows through the cooler core 15. Thus, the air to be delivered into the vehicle cabin can be cooled in the cooler core 15. That is, the inside of the vehicle cabin can be cooled.

When the cell temperature adjuster path 36 is connected to the first coolant circuit, the coolant cooled in the coolant cooler 13 flows through the cell temperature adjuster 16 and thus can cool the cell. When the cell temperature adjuster path 36 is connected to the second coolant circuit, the coolant heated in the coolant heater 14 flows through the cell temperature adjuster 16 and thus can heat the cell.

When the inverter temperature adjuster path 38 is connected to the first coolant circuit, the coolant cooled in the coolant cooler 13 flows through the inverter temperature adjuster 18 and thus can cool the inverter. When the inverter temperature adjuster path 38 is connected to the second coolant circuit, the coolant heated in the coolant heater 14 flows through the inverter temperature adjuster 18 and thus can heat the inverter.

The switching section 21 and the switching section 22 of this embodiment respectively have the first valve body 211, the second valve body 212, the third valve body 221, and the fourth valve body 222. The first valve body 211 switches between the state that the coolant discharged from the first pump 11 flows in and a state that the coolant discharged from the first pump 11 does not flow in, with respect to the more than or equal to three of coolant passing device 15, 16, 18, 19. The second valve body 212 switches between the state that the coolant discharged from the second pump 12 flows in and the state that the coolant discharged from the second pump 12 does not flow in, with respect to the more than or equal to three of coolant passing device 15, 16, 18, 19. The third valve body 221 switches between a state that the coolant flows to the first pump 11 and a state that the coolant does not flow to the first pump 11, with respect to the more than or equal to three of coolant passing device 15, 16, 18, 19. The fourth valve body switches between a state that the coolant flows to the second pump 12 and a state that the coolant does not flow to the second pump 12, with respect to the more than or equal to three of coolant passing device 15, 16, 18, 19.

According to the above-described features, the coolant circulated through path of the more than or equal to three of coolant passing device 15, 16, 18, 19 can be switched by the four valve bodies 211, 212, 221, 222. In addition, even when a quantity of the coolant passing device increases, a quantity of the valve bodies is unnecessary to increase. Thus, the configuration can be simplified.

Second Embodiment

In this embodiment, two valve bodies of the first valve body 211, the second valve body 212, the third valve body 221, and the fourth valve body 222 are mechanically coupled to path other, whereas remaining two valve bodies are also mechanically coupled to path other.

Figure 3:
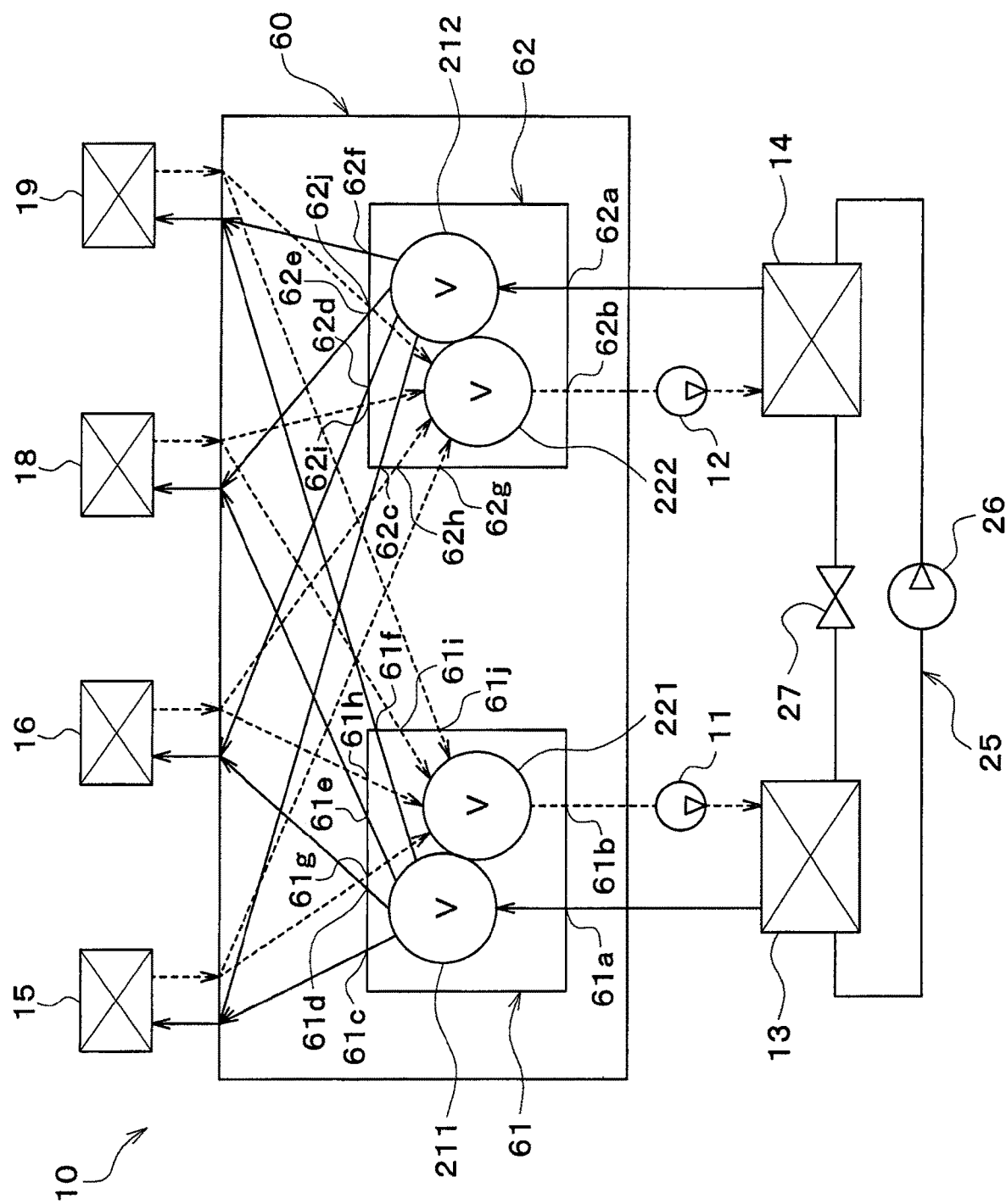
FIG. 3 is an overall configuration diagram illustrating a vehicular heat management system in a second embodiment.

More specifically, as shown in FIG. 3, the first valve body 211 and the third valve body 221 are mechanically coupled, and the second valve body 212 and the fourth valve body 222 are mechanically coupled.

A first switching valve 61 that is constructed of the first valve body 211 and the third valve body 221 has a first inlet 61a, a first outlet 61b, a second outlet 61c, a third outlet 61d, a fourth outlet 61e, a fifth outlet 61f, a second inlet 61g, a third inlet 61h, a fourth inlet 61i, and a fifth inlet 61j.

The second outlet 61c, the third outlet 61d, the fourth outlet 61e, and the fifth outlet 61f are opened or closed by the first valve body 211. The second inlet 61g, the third inlet 61h, the fourth inlet 61i, and the fifth inlet 61j are opened or closed by the third valve body 221.

The first inlet 61a is connected to the coolant outlet side of the coolant cooler 13. The first outlet 61b is connected to the coolant inlet side of the coolant cooler 13.

The second outlet 61c is connected to the coolant inlet side of the cooler core 15. The third outlet 61d is connected to the coolant inlet side of the cell temperature adjuster 16. The fourth outlet 61e is connected to the coolant inlet side of the inverter temperature adjuster 18. The fifth outlet 61f is connected to the coolant inlet side of the radiator 19.

The second inlet 61g is connected to the coolant outlet side of the cooler core 15. The third inlet 61h is connected to the coolant outlet side of the cell temperature adjuster 16. The fourth inlet 61i is connected to the coolant outlet side of the inverter temperature adjuster 18. The fifth inlet 61j is connected to a coolant outlet side of the radiator 19.

A second switching valve 62 that is constructed of the second valve body 212 and the fourth valve body 222 has a first inlet 62a, a first outlet 62b, a second outlet 62c, a third outlet 62d, a fourth outlet 62e, a fifth outlet 62f, a second inlet 62g, a third inlet 62h, a fourth inlet 62i, and a fifth inlet 62j.

The second outlet 62c, the third outlet 62d, the fourth outlet 62e, and the fifth outlet 62f are opened or closed by the second valve body 212. The second inlet 62g, the third inlet 62h, the fourth inlet 62i, and the fifth inlet 62j are opened or closed by the fourth valve body 222.

The first inlet 62a is connected to the coolant outlet side of the coolant heater 14. The first outlet 62b is connected to the coolant inlet side of the coolant heater 14.

The second outlet 62c is connected to the coolant inlet side of the cooler core 15. The third outlet 62d is connected to the coolant inlet side of the cell temperature adjuster 16.

The fourth outlet 62e is connected to the coolant inlet side of the inverter temperature adjuster 18. The fifth outlet 62f is connected to the coolant inlet side of the radiator 19.

The second inlet 62g is connected to the coolant outlet side of the cooler core 15. The third inlet 62h is connected to the coolant outlet side of the cell temperature adjuster 16. The fourth inlet 62i is connected to the coolant outlet side of the inverter temperature adjuster 18. The fifth inlet 62j is connected to the coolant outlet side of the radiator 19.

The first switching valve 61 and the second switching valve 62 constitute a switching device 60 (i.e., a switching section) that switches the flow of the coolant.

Figure 4:
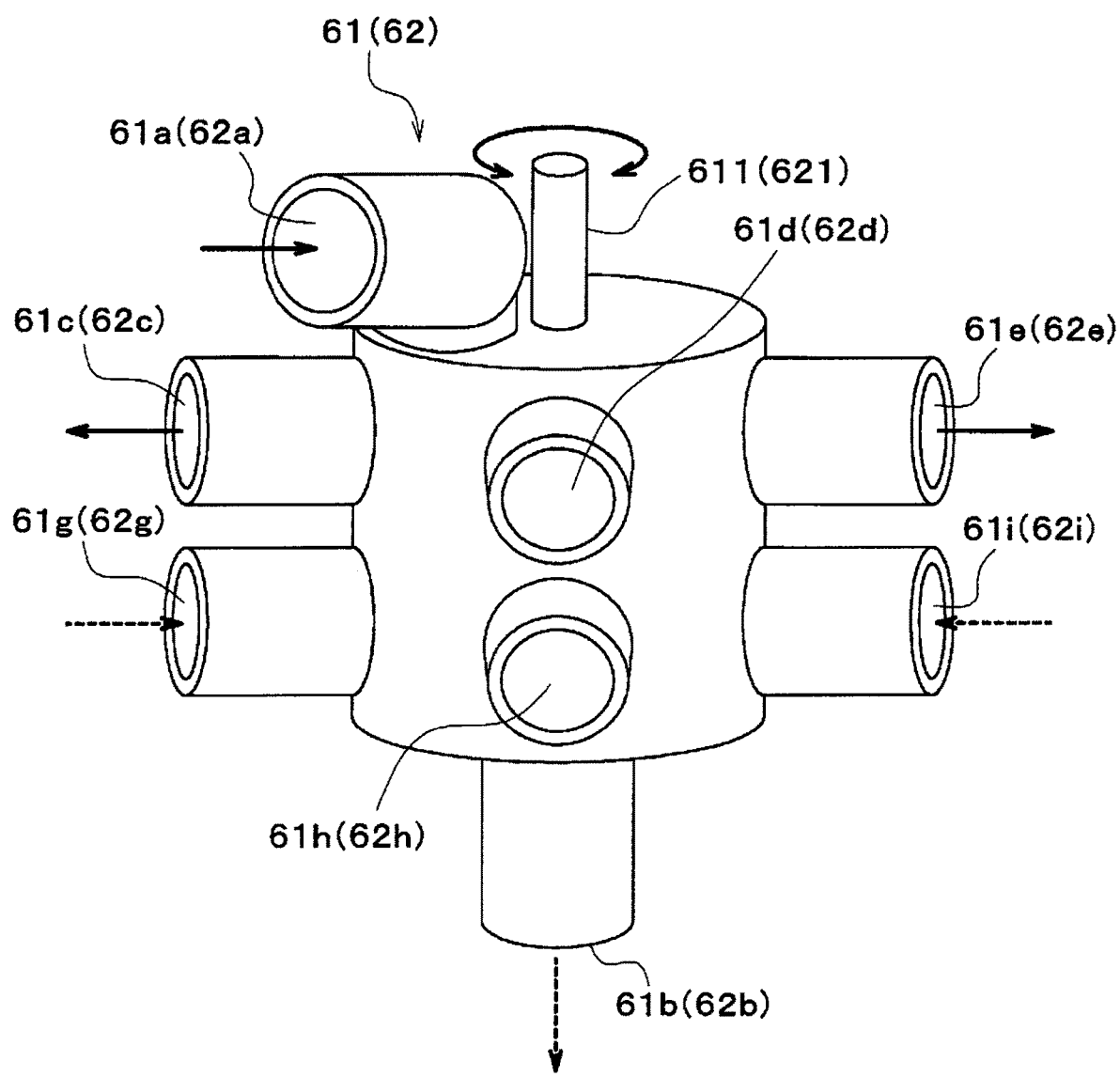
FIG. 4 is a perspective view illustrating a first switching valve in the second embodiment.

FIG. 4 is a perspective view of the first switching valve 61 that is constructed of the first valve body 211 and the third valve body 221. The first switching valve 61 has a rotational shaft 611 of the first valve body 211 and the third valve body 221. The rotational shaft 611 is coupled to an electric motor for switching valves (not shown). Thus, the first valve body 211 and the third valve body 221 are rotationally driven in the interlocking manner.

Reference signs in parentheses in FIG. 4 are reference signs that correspond to the second switching valve 62 constructed of the second valve body 212 and the fourth valve body 222. The second switching valve 62 has a similar structure to the first switching valve 61 and has a rotational shaft 621 of the second valve body 212 and the fourth valve body 222. The rotational shaft 621 is coupled to an electric motor for switching valves (not shown). Thus, the second valve body 212 and the fourth valve body 222 are rotationally driven in the interlocking manner.

Figure 5:
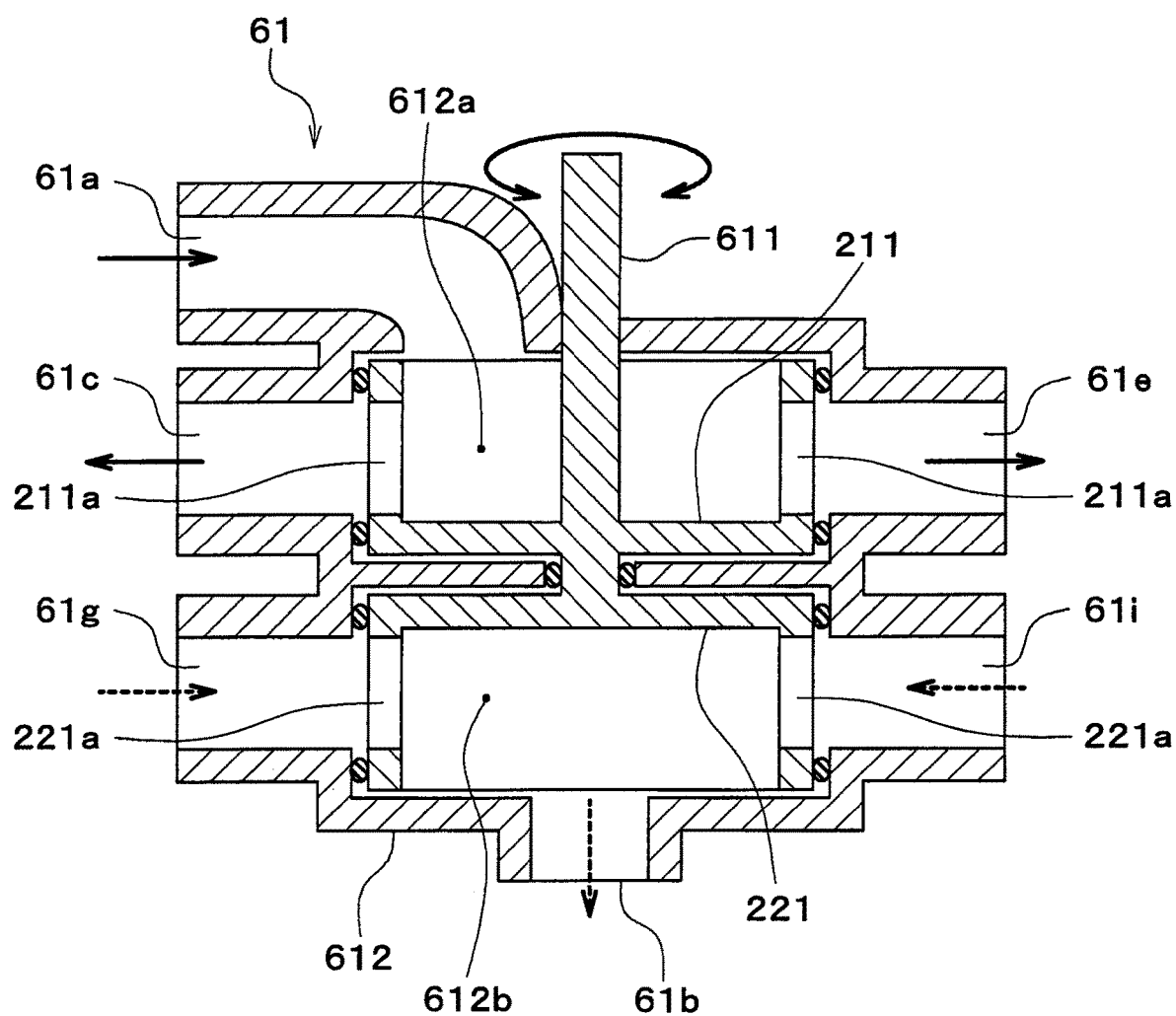
FIG. 5 is a cross-sectional view illustrating the first switching valve in the second embodiment in an axial direction.
Figure 6:
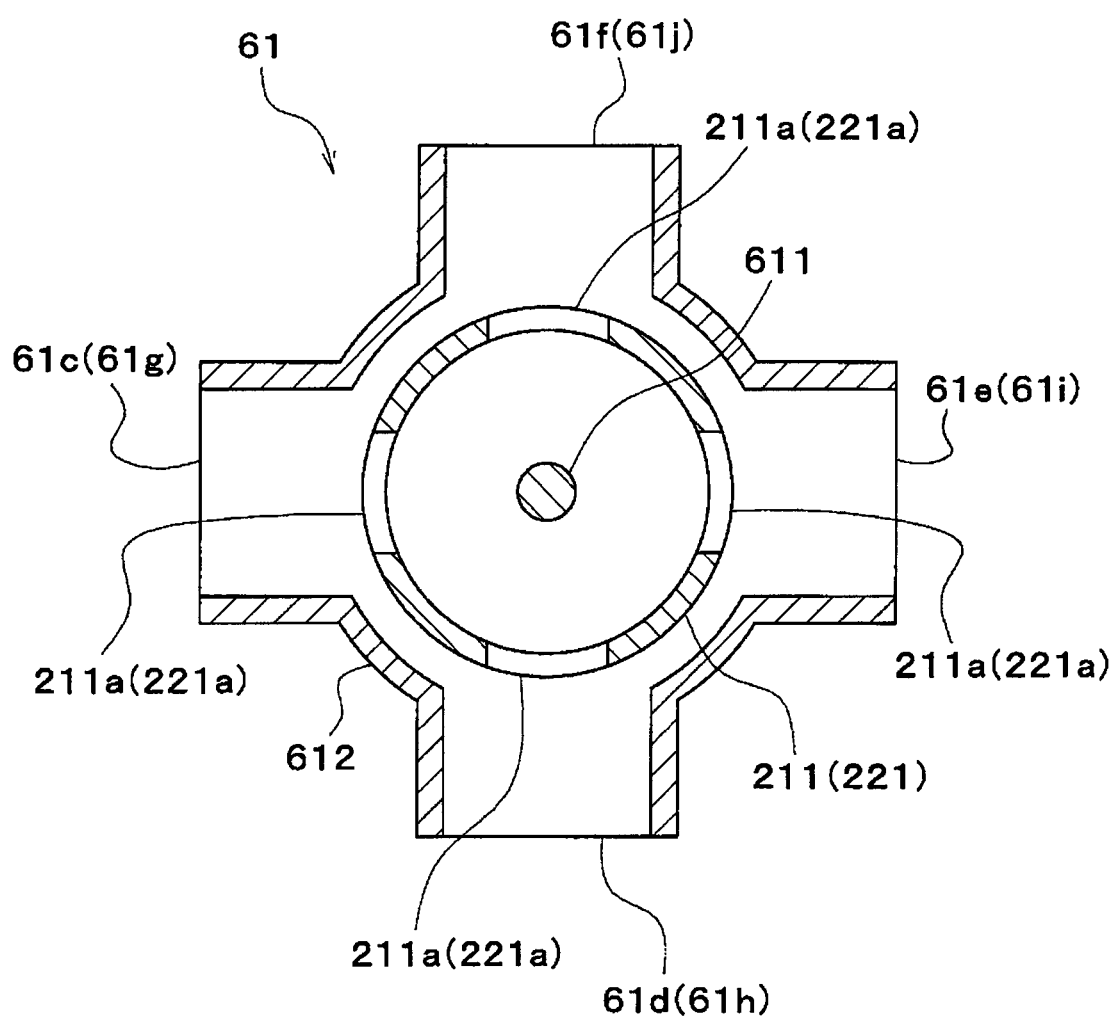
FIG. 6 is a cross-sectional view illustrating the first switching valve in the second embodiment in a direction perpendicular to an axis.

FIG. 5 is a cross-sectional view illustrating the first switching valve 61 and taken at a center of the rotational shaft 621 along a line parallel with the rotational shaft 621. FIG. 6 is a cross-sectional view illustrating the first switching valve 61 and taken at a portion of the first valve body 211 along a line perpendicular to the rotational shaft 621. Reference signs in parentheses in FIG. 6 are reference signs that correspond to a cross section in which the first switching valve 61 is cut along a portion of the third valve body 221.

A case 612 of the first switching valve 61 forms (i) a valve body chamber 612a that houses the first valve body 211 and (ii) a valve body chamber 612b that houses the third valve body 221. The valve body chamber 612a and the valve body chamber 612b are formed separately from path other.

The case 612 of the first switching valve 61 is a valve body chamber forming member that forms the valve body chambers 612a, 612b.

The first valve body 211 and the third valve body 221 are formed in a cylindrical shape and are mechanically coupled by the common rotational shaft 611.

The case 612 is formed in a substantially cylindrical shape. The first inlet 61a is formed in an end surface on the first valve body 211 side of the case 612 (i.e., an upper end surface of the first valve body 211 in an arrangement in FIG. 5). The first outlet 61b is formed in an end surface on the third valve body 221 side of the case 612 (i.e., a lower end surface of the third valve body 221 in the arrangement in FIG. 5).

The second outlet 61c, the third outlet 61d, the fourth outlet 61e, and the fifth outlet 61f are formed in a circumferential surface on the first valve body 211 side of the case 612. The second inlet 61g, the third inlet 61h, the fourth inlet 61i, and the fifth inlet 61j are formed in the circumferential surface on the third valve body 221 side of the case 612.

A hole 211a that can overlap the second outlet 61c, the third outlet 61d, the fourth outlet 61e, and the fifth outlet 61f is formed in a circumferential surface of the first valve body 211. The second outlet 61c, the third outlet 61d, the fourth outlet 61e, and the fifth outlet 61f are opened or closed when the first valve body 211 rotates to change a position of the hole 211a.

A hole 221a that can overlap the second inlet 61g, the third inlet 61h, the fourth inlet 61i, and the fifth inlet 61j is formed in a circumferential surface of the third valve body 221. The second inlet 61g, the third inlet 61h, the fourth inlet 61i, and the fifth inlet 61j are opened or closed when the third valve body 221 rotates to change a position of the hole 221a.

The first valve body 211 and the third valve body 221 are formed such that opened/closed states of the second outlet 61c and the second inlet 61g are basically the same as path other. That is, when the second outlet 61c is in the opened state, the second inlet 61g is also in the opened state. When the second outlet 61c is in the closed state, the second inlet 61g is also in the closed state.

Similarly, the first valve body 211 and the third valve body 221 are formed such that opened/closed states of the third outlet 61d and the third inlet 61h are basically the same as path other, that opened/closed states of the fourth outlet 61e and the fourth inlet 61i are basically the same as path other, and that opened/closed states of the fifth outlet 61f and the fifth inlet 61j are basically the same as path other.

In this way, similar to the above embodiment, the coolant that circulates through the coolant passing device 15, 16, 18, 19 can be switched.

Figure 7:
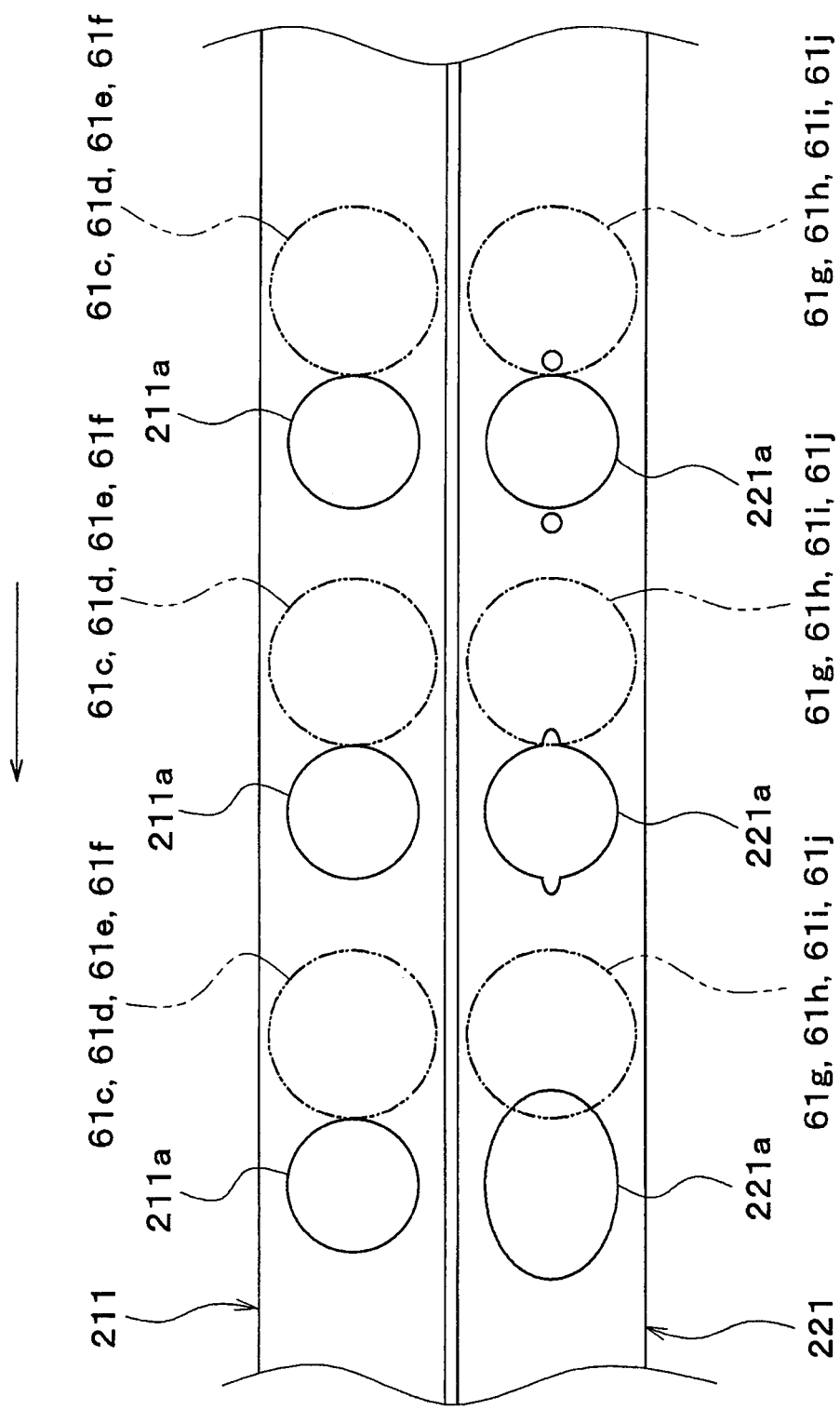
FIG. 7 is a development view illustrating a first valve body and a third valve body of the first switching valve in the second embodiment and developed in a circumferential direction.

FIG. 7 is a view for explaining opening/closing timing of the outlets 61c, 61d, 61e, 61f and the inlets 61g, 61h, 61i, 61j by the first valve body 211 and the third valve body 221, and is a development view in which the first valve body 211 and the third valve body 221 are developed in a circumferential direction.

Two-dot chain lines in FIG. 7 indicate the outlets 61c, 61d, 61e, 61f and the inlets 61g, 61h, 61i, 61j of the case 612. An arrow in FIG. 7 indicates a rotational direction of the first valve body 211 and the third valve body 221.

The hole 221a of the third valve body 221 has a shape that is expanded in a reverse direction from the rotational direction when compared to the hole 211a of the first valve body 211. More specifically, the hole 221a has an oval shape like the hole 221a on a left side in FIG. 7, is provided with a notch shape like the hole 221a at a center of FIG. 7, or is provided with small holes like the hole 221a on a right side in FIG. 7.

According to the above-described features, when the first valve body 211 and the third valve body 221 are rotated in the arrow direction to switch the flow of the coolant by the first switching valve 61, as shown in FIG. 7, the outlets 61c, 61d, 61e, 61f are closed before the inlets 61g, 61h, 61i, 61j are closed.

As a result, the coolant that flows into the device 15, 16, 18, 19 connected to the first switching valve 61 is blocked before the coolant that flows out from the device 15, 16, 18, 19 is blocked. Thus, when the flow of the coolant with respect to the device 15, 16, 18, 19 is switched, an increase in inner pressure of the device 15, 16, 18, 19 can be restricted. Therefore, application of excess stress on the device 15, 16, 18, 19 can be restricted, and thus the device 15, 16, 18, 19 can be protected.

For a similar reason, in the first valve body 211 and the third valve body 221, when the outlets 61c, 61d, 61e, 61f and the inlets 61g, 61h, 61i, 61j are opened, the inlets 61g, 61h, 61i, 61j are opened before the outlets 61c, 61d, 61e, 61f are opened.

An internal structure of the second switching valve 62 is similar to an internal structure of the first switching valve 61 shown in FIG. 5 to FIG. 7. Thus, the illustration and the description thereof are omitted.

In the second valve body 212 and the fourth valve body 222, opened/closed states of the second outlet 62c and the second inlet 62g are basically the same as path other, opened/closed states of the third outlet 62d and the third inlet 62h are basically the same as path other, opened/closed states of the fourth outlet 62e and the fourth inlet 62i are basically the same as path other, and opened/closed states of the fifth outlet 62f and the fifth inlet 62j are basically the same as path other.

In the second valve body 212 and the fourth valve body 222, when the outlets 62c, 62d, 62e, 62f and the inlets 62g, 62h, 62i, 62j are closed, the outlets 62c, 62d, 62e, 62f are closed before the inlets 62g, 62h, 62i, 62j are closed.

In the second valve body 212 and the fourth valve body 222, when the outlets 62c, 62d, 62e, 62f and the inlets 62g, 62h, 62i, 62j are opened, the inlets 62g, 62h, 62i, 62j are opened before the outlets 62c, 62d, 62e, 62f are opened.

In this embodiment, the two valve bodies of the first valve body 211, the second valve body 212, the third valve body 221, and the fourth valve body 222 are mechanically coupled to path other. In this way, a mechanism for driving the first valve body 211, the second valve body 212, the third valve body 221, and the fourth valve body 222 can be simplified.

In this embodiment, the remaining two of the first valve body 211, the second valve body 212, the third valve body 221, and the fourth valve body 222 are mechanically coupled to path other. Therefore, the mechanism for driving the first valve body 211, the second valve body 212, the third valve body 221, and the fourth valve body 222 can further be simplified.

In this embodiment, the first valve body 211 and the third valve body 221 are mechanically coupled to path other. Accordingly, the valve bodies 211, 221 on the first pump 11 side are coupled. Thus, mixture of the low-temperature coolant on the first pump 11 side and the high-temperature coolant on the second pump 12 side, and heat transfer between the low-temperature coolant on the first pump 11 side and the high-temperature coolant on the second pump 12 side can be restricted.

In this embodiment, the second valve body 212 and the fourth valve body 222 are mechanically coupled to path other. Accordingly, the valve bodies 212, 222 on the second pump 12 side are coupled. Thus, the mixture of the low-temperature coolant on the first pump 11 side and the high-temperature coolant on the second pump 12 side, and the heat transfer between the low-temperature coolant on the first pump 11 side and the high-temperature coolant on the second pump 12 side can be restricted.

In this embodiment, the first switching valve 61 and the second switching valve 62 may be integrated, and the switching device 60 may be constructed as a single switching valve. For example, the case of the first switching valve 61 and the case of the second switching valve 62 may mechanically be coupled. The case of the first switching valve 61 and the case of the second switching valve 62 may integrally be molded.

Third Embodiment

Figure 8:
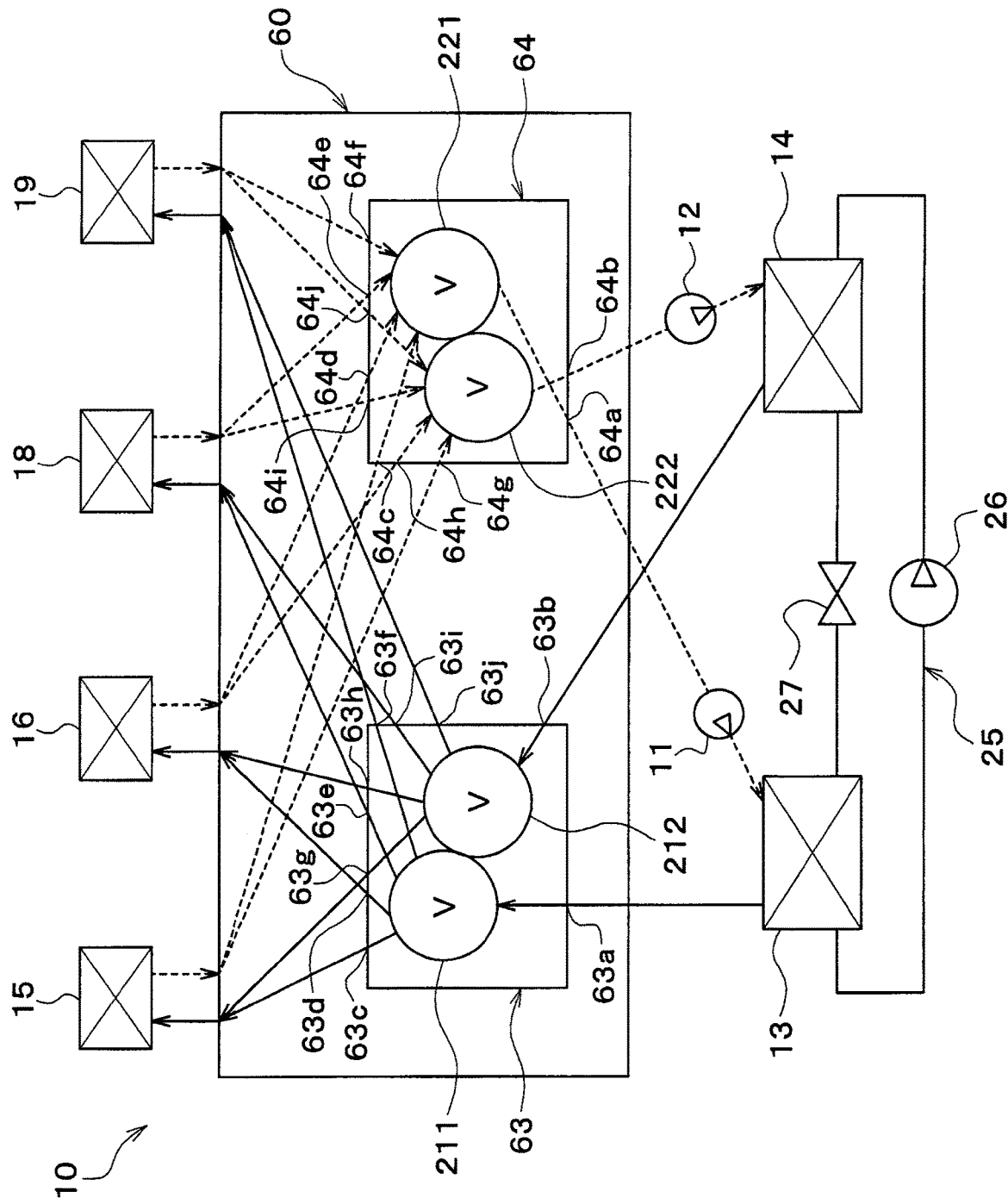
FIG. 8 is an overall configuration diagram illustrating a vehicular heat management system in a third embodiment.

In the above second embodiment, the first valve body 211 and the third valve body 221 are mechanically coupled, and the second valve body 212 and the fourth valve body 222 are mechanically coupled. In this embodiment, as shown in FIG. 8, the first valve body 211 and the second valve body 212 are mechanically coupled, and the third valve body 221 and the fourth valve body 222 are mechanically coupled.

A first switching valve 63 that is constructed of the first valve body 211 and the second valve body 212 has a first inlet 63a, a second inlet 63b, a first outlet 63c, a second outlet 63d, a third outlet 63e, a fourth outlet 63f, a fifth outlet 63g, a sixth outlet 63h, a seventh outlet 63i, and an eighth outlet 63j.

The first outlet 63c, the second outlet 63d, the third outlet 63e, and the fourth outlet 63f are opened or closed by the first valve body 211. The fifth outlet 63g, the sixth outlet 63h, the seventh outlet 63i, and the eighth outlet 63j are opened or closed by the second valve body 212.

The first inlet 63a is connected to the coolant outlet side of the coolant cooler 13. The second inlet 63b is connected to the coolant outlet side of the coolant heater 14.

The first outlet 63c and the fifth outlet 63g are connected to the coolant inlet side of the cooler core 15. The second outlet 63d and the sixth outlet 63h are connected to the coolant inlet side of the cell temperature adjuster 16.

The third outlet 63e and the seventh outlet 63i are connected to the coolant inlet side of the inverter temperature adjuster 18. The fourth outlet 63f and the eighth outlet 63j are connected to the coolant inlet side of the radiator 19.

A second switching valve 64 that is constructed of the third valve body 221 and the fourth valve body 222 has a first outlet 64a, a second outlet 64b, a first inlet 64c, a second inlet 64d, a third inlet 64e, a fourth inlet 64f, a fifth inlet 64g, a sixth inlet 64h, a seventh inlet 64i, and an eighth inlet 64j.

The first inlet 64c, the second inlet 64d, the third inlet 64e, and the fourth inlet 64f are opened or closed by the third valve body 221. The fifth inlet 64g, the sixth inlet 64h, the seventh inlet 64i, and the eighth inlet 64j are opened or closed by the fourth valve body 222.

The first outlet 64a is connected to the coolant inlet side of the coolant cooler 13. The second outlet 64b is connected to the coolant inlet side of the coolant heater 14.

The first inlet 64c and the fifth inlet 64g are connected to the coolant outlet side of the cooler core 15. The second inlet 64d and the sixth inlet 64h are connected to the coolant outlet side of the cell temperature adjuster 16.

The third inlet 64e and the seventh inlet 64i are connected to the coolant outlet side of the inverter temperature adjuster 18. The fourth inlet 64f and the eighth inlet 64j are connected to the coolant outlet side of the radiator 19.

The first switching valve 63 and the second switching valve 64 constitute the switching device 60 (i.e., the switching section) that switches the flow of the coolant.

Basic structures of the first switching valve 63 and the second switching valve 64 are similar to that of the first switching valve 61 of the above second embodiment shown in FIG. 4 to FIG. 6.

Figure 9:
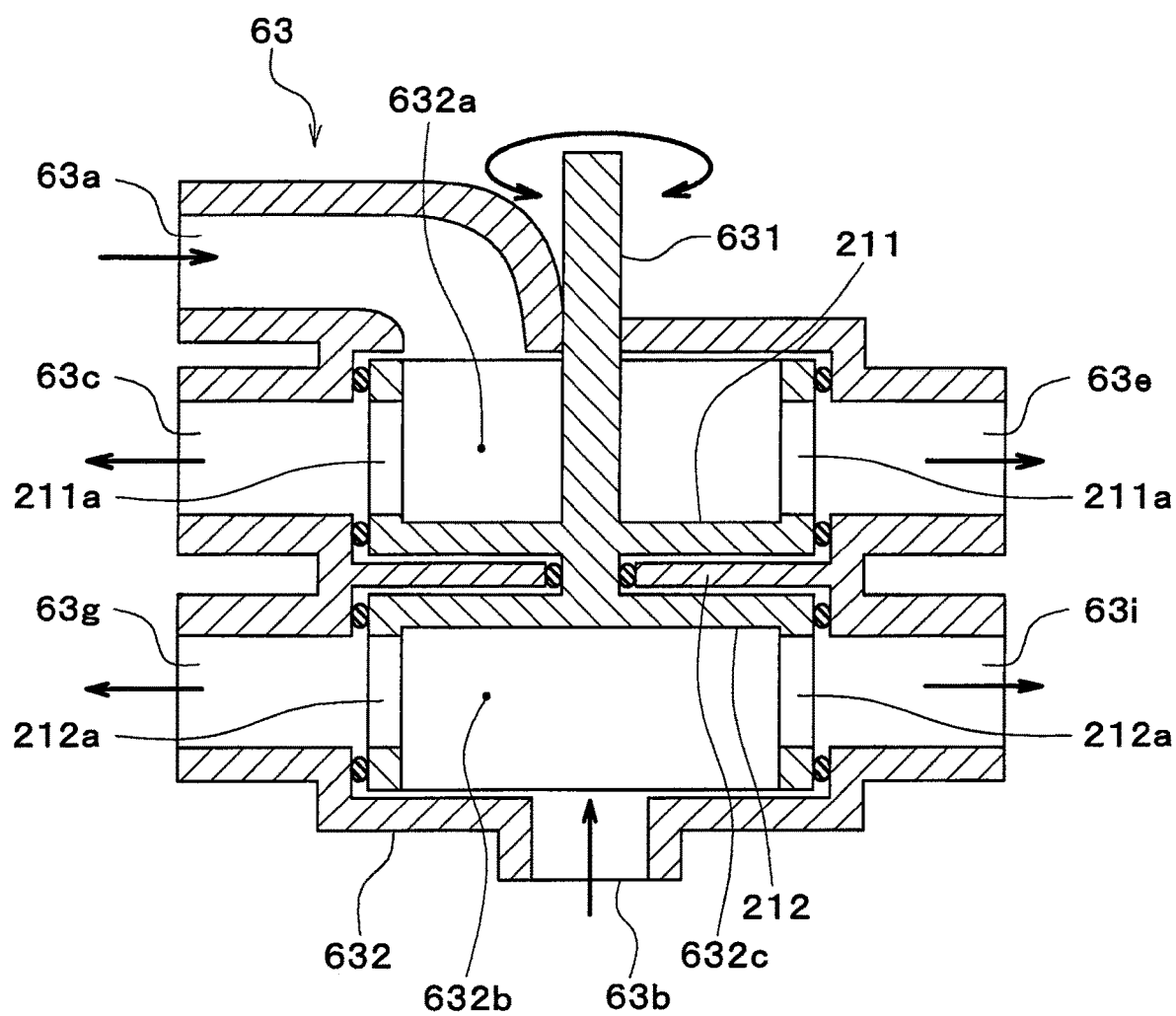
FIG. 9 is a cross-sectional view illustrating a first switching valve in the third embodiment in the axial direction.

FIG. 9 is a cross-sectional view illustrating the first switching valve 63 and taken at a center of a rotational shaft 631 along a line parallel to the rotational shaft 631.

A case 632 of the first switching valve 63 forms (i) a first-pump-side valve body chamber 632a that houses the first valve body 211 (i.e., the valve body on a side of the first pump 11) and (ii) a second-pump-side valve body chamber 632b that houses the second valve body 212 (i.e., the valve body on a side of the second pump 12). The first-pump-side valve body chamber 632a and the second-pump-side valve body chamber 632b are formed separately from path other.

The case 632 of the first switching valve 63 is a valve body chamber forming member that forms the valve body chambers 632a, 632b.

The first valve body 211 and the second valve body 212 are mechanically coupled to path other by the common rotational shaft 631. The hole 211a that can overlap the first outlet 63c, the second outlet 63d, the third outlet 63e, and the fourth outlet 63f is formed on the circumferential surface of the first valve body 211. A hole 212a that can overlap the fifth outlet 63g, the sixth outlet 63h, the seventh outlet 63i, and the eighth outlet 63j is formed on a circumferential surface of the second valve body 212.

In the first switching valve 63, a partition wall 632c that partitions the first-pump-side valve body chamber 632a housing the first valve body 211 and the second-pump-side valve body chamber 632b housing the second valve body 212 preferably has a heat insulation property. It is because the heat transfer between the low-temperature coolant flowing through the first valve body 211 and the high-temperature coolant flowing through the second valve body 212 can be restricted. For example, the partition wall 632c may have the heat insulation property by being provided with an air layer. The partition wall 632c may have the heat insulation property by being formed of a material with a superior heat insulation property.

Figure 10:
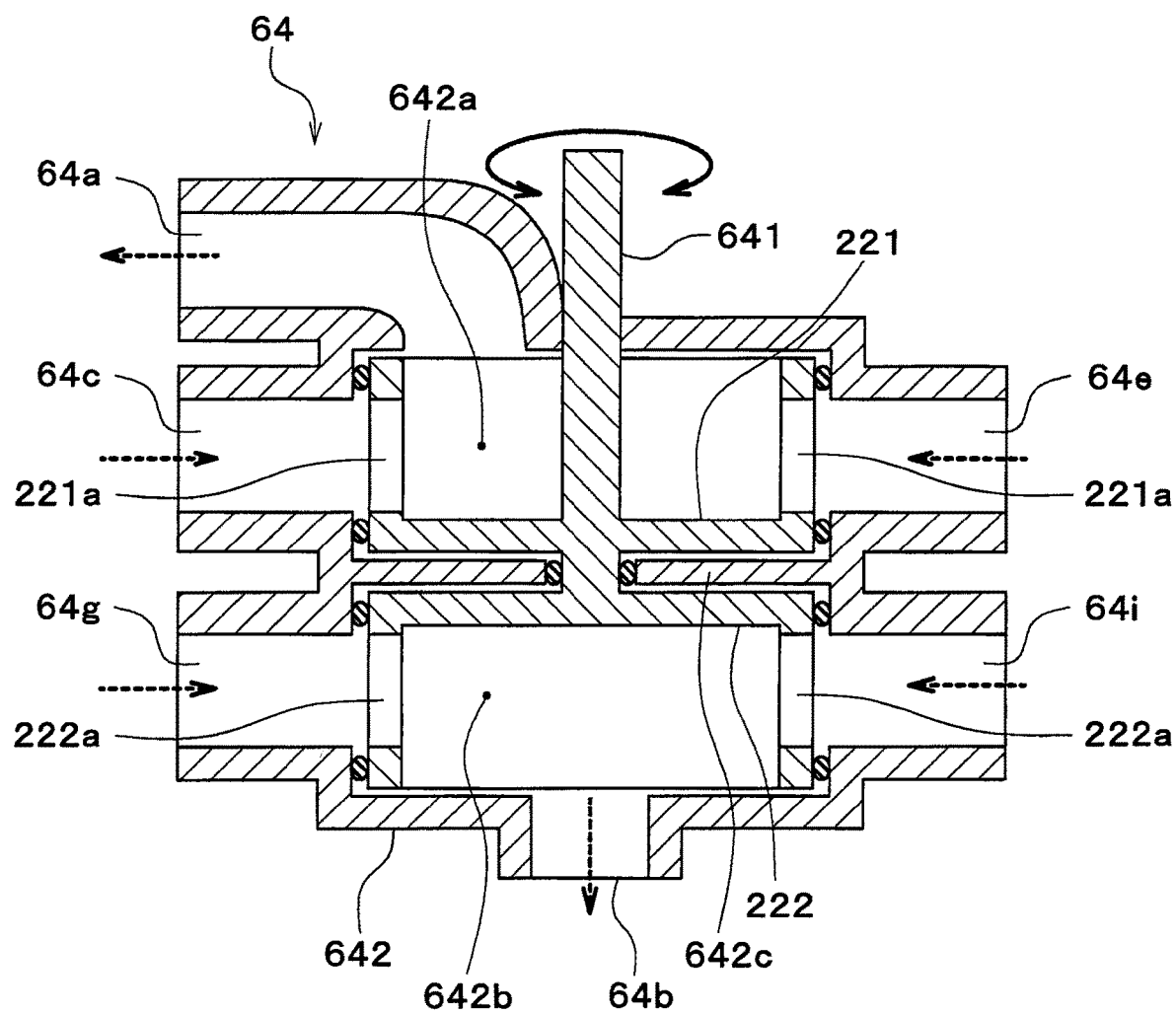
FIG. 10 is a cross-sectional view illustrating a second switching valve in the third embodiment in the axial direction.

FIG. 10 is a cross-sectional view illustrating the second switching valve 64 and taken at a center of a rotational shaft 641 along a line parallel to the rotational shaft 641.

A case 642 of the second switching valve 64 forms (i) a first-pump-side valve body chamber 642a that houses the third valve body 221 (i.e., the valve body on a side of the first pump 11) and (ii) a second-pump-side valve body chamber 642b that houses the fourth valve body 222 (i.e., the valve body on a side of the second pump 12). The first-pump-side valve body chamber 642a and the second-pump-side valve body chamber 642b are formed separately from path other. The case 642 of the second switching valve 64 is a valve body chamber forming member that forms the valve body chambers 642a, 642b.

The third valve body 221 and the fourth valve body 222 are mechanically coupled to path other by the common rotational shaft 641. The hole 221a that can overlap the first inlet 64c, the second inlet 64d, the third inlet 64e, and the fourth inlet 64f is formed on the circumferential surface of the third valve body 221. The hole 222a that can overlap the fifth inlet 64g, the sixth inlet 64h, the seventh inlet 64i, and the eighth inlet 64j is formed on a circumferential surface of the fourth valve body 222.

For a similar reason to the first switching valve 63, in the second switching valve 64, a partition wall 642c that partitions the first-pump-side valve body chamber 642a housing the third valve body 221 and the second-pump-side valve body chamber 642b housing the fourth valve body 222 preferably has the heat insulation property.

The first valve body 211 and the second valve body 212 are formed such that opened/closed states of the first outlet 63c and the fifth outlet 63g are basically opposite of path other, that opened/closed states of the second outlet 63d and the sixth outlet 63h are basically opposite of path other, that opened/closed states of the third outlet 63e and the seventh outlet 63i are basically opposite of path other, and that opened/closed states of the fourth outlet 63f and the eighth outlet 63j are basically opposite of path other.

The third valve body 221 and the fourth valve body 222 are formed such that opened/closed states of the first inlet 64c and the fifth inlet 64g are basically opposite of path other, that opened/closed states of the second inlet 64d and the sixth inlet 64h are basically opposite of path other, that opened/closed states of the third inlet 64e and the seventh inlet 64i are basically opposite of path other, and that opened/closed states of the fourth inlet 64f and the eighth inlet 64j are basically opposite of path other.

In this way, similar to the above embodiment, the coolant that circulates through the coolant passing device 15, 16, 18, 19 can be switched.

In this embodiment, the case 632 of the first switching valve 63 forms (i) the first-pump-side valve body chamber 632a that houses the valve body 211, which is on a side of the first pump 11, of the first valve body 211, the second valve body 212, the third valve body 221, and the fourth valve body 222, and (ii) the second-pump-side valve body chamber 632b that houses the valve body 212, which is on a side of the second pump 12, of the first valve body 211, the second valve body 212, the third valve body 221, and the fourth valve body 222 such that the first-pump-side valve body chamber 632a and the second-pump-side valve body chamber 632b are formed separately from path other. The case 642 of the second switching valve 64 forms (i) the first-pump-side valve body chamber 642a that house the valve body 221, which is on a side of the first pump 11, of the first valve body 211, the second valve body 212, the third valve body 221, and the fourth valve body 222 and (ii) the second-pump-side valve body chamber 642b that houses the valve body 222, which is on a side of the second pump 12, of the first valve body 211, the second valve body 212, the third valve body 221, and the fourth valve body 222 such that the first-pump-side valve body 642a and the second-pump-side valve body 642b are formed separately from path other.

In this way, the mixture of the low-temperature coolant on the first pump 11 side and the high-temperature coolant on the second pump 12 side in the first valve body 211, the second valve body 212, the third valve body 221, and the fourth valve body 222 can be restricted.

In this embodiment, the first switching valve 63 and the second switching valve 64 may be integrated to constitute the single switching device 60. For example, the case 632 of the first switching valve 63 and the case 642 of the second switching valve 64 may mechanically be coupled. The case 632 of the first switching valve 63 and the case 642 of the second switching valve 64 may integrally be molded.

Fourth Embodiment

Figure 11:
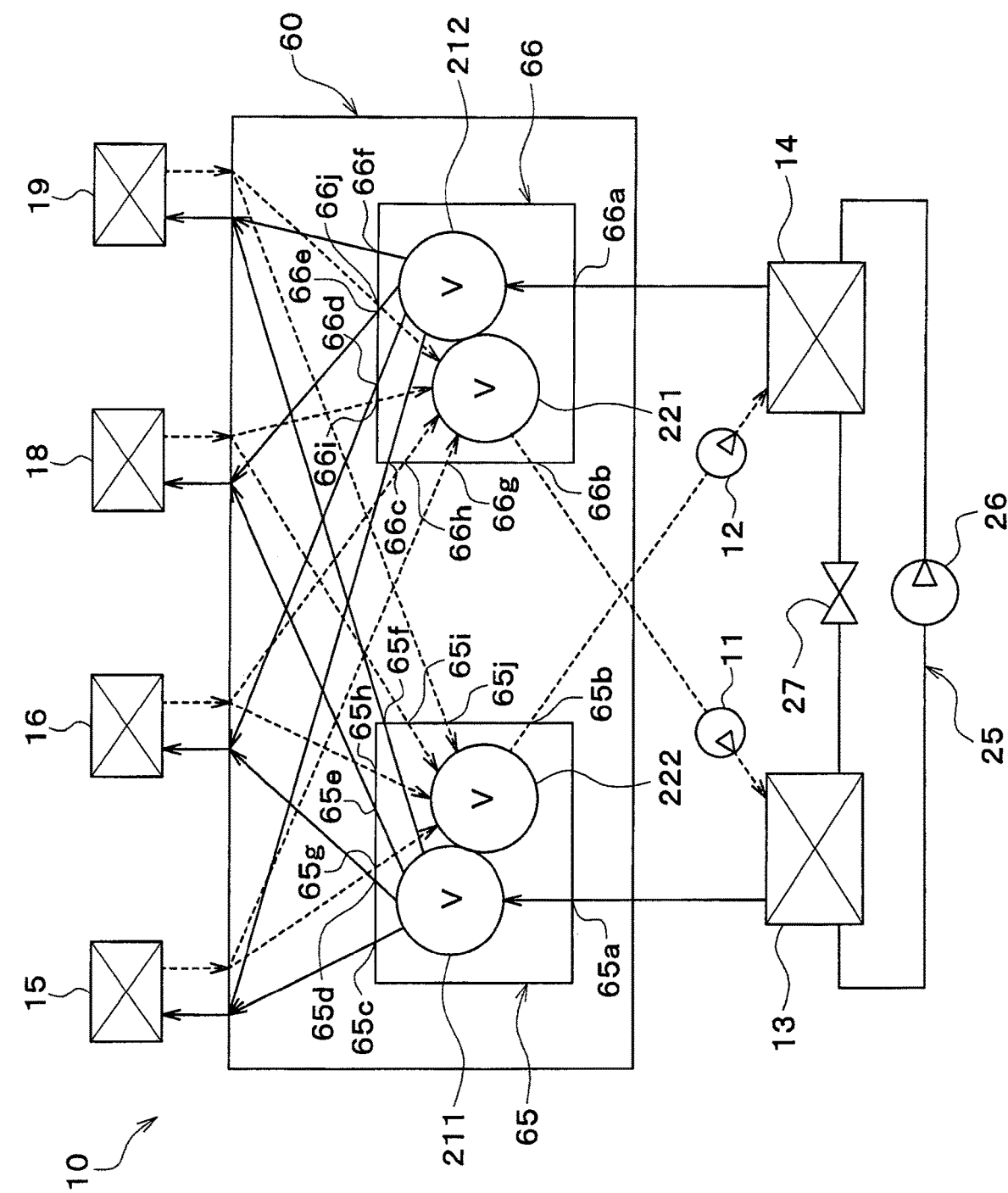
FIG. 11 is an overall configuration diagram illustrating a vehicular heat management system in a fourth embodiment.

In this embodiment, as shown in FIG. 11, the first valve body 211 and the fourth valve body 222 are mechanically coupled, and the second valve body 212 and the third valve body 221 are mechanically coupled.

A first switching valve 65 that is constructed of the first valve body 211 and the fourth valve body 222 has a first inlet 65a, a first outlet 65b, a second outlet 65c, a third outlet 65d, a fourth outlet 65e, the fifth outlet 65f, a second inlet 65g, a third inlet 65h, the fourth inlet 65i, and the fifth inlet 65j.

The second outlet 65c, the third outlet 65d, the fourth outlet 65e, and the fifth outlet 65f are opened or closed by the first valve body 211. The second inlet 65g, the third inlet 65h, the fourth inlet 65i, and the fifth inlet 65j are opened or closed by the fourth valve body 222.

The first inlet 65a is connected to the coolant outlet side of the coolant cooler 13. The first outlet 65b is connected to the coolant inlet side of the coolant heater 14.

The second outlet 65c is connected to the coolant inlet side of the cooler core 15. The third outlet 65d is connected to the coolant inlet side of the cell temperature adjuster 16.

The fourth outlet 65e is connected to the coolant inlet side of the inverter temperature adjuster 18. The fifth outlet 65f is connected to the coolant inlet side of the radiator 19.

The second inlet 65g is connected to the coolant outlet side of the cooler core 15. The third inlet 65h is connected to the coolant outlet side of the cell temperature adjuster 16. The fourth inlet 65i is connected to the coolant outlet side of the inverter temperature adjuster 18. The fifth inlet 65j is connected to the coolant outlet side of the radiator 19.

A second switching valve 66 that is constructed of the second valve body 212 and the third valve body 221 has a first inlet 66a, a first outlet 66b, a second outlet 66c, a third outlet 66d, a fourth outlet 66e, a fifth outlet 66f, a second inlet 66g, a third inlet 66h, a fourth inlet 66i, and a fifth inlet 66j.

The second outlet 66c, the third outlet 66d, the fourth outlet 66e, and the fifth outlet 66f are opened or closed by the second valve body 212. The second inlet 66g, the third inlet 66h, the fourth inlet 66i, and the fifth inlet 66j are opened or closed by the third valve body 221.

The first inlet 66a is connected to the coolant outlet side of the coolant heater 14. The first outlet 66b is connected to the coolant inlet side of the coolant cooler 13.

The second outlet 66c is connected to the coolant inlet side of the cooler core 15. The third outlet 66d is connected to the coolant inlet side of the cell temperature adjuster 16. The fourth outlet 66e is connected to the coolant inlet side of the inverter temperature adjuster 18. The fifth outlet 66f is connected to the coolant inlet side of the radiator 19.

The second inlet 66g is connected to the coolant outlet side of the cooler core 15. The third inlet 66h is connected to the coolant outlet side of the cell temperature adjuster 16. The fourth inlet 66i is connected to the coolant outlet side of the inverter temperature adjuster 18. The fifth inlet 66j is connected to the coolant outlet side of the radiator 19.

The first switching valve 65 and the second switching valve 66 constitute the switching device 60 (i.e., the switching section) that switches the flow of the coolant.

Basic structures of the first switching valve 65 and the second switching valve 66 are similar to that of the first switching valve 61 of the above second embodiment shown in FIG. 4 to FIG. 6.

For the similar reason to the first switching valve 63 of the above third embodiment, in the first switching valve 65, a partition wall that partitions a valve body chamber housing the first valve body 211 and a valve body chamber housing the fourth valve body 222 preferably has the heat insulation property.

For the similar reason, in the second switching valve 66, a partition wall that separates a valve body chamber housing the second valve body 212 and a valve body chamber housing the third valve body 221 preferably has the heat insulation property.

The first valve body 211 and the fourth valve body 222 are formed such that opened/closed states of the second outlet 65c and the second inlet 65g are basically opposite of path other, that opened/closed states of the third outlet 65d and the third inlet 65h are basically opposite of path other, that opened/closed states of the fourth outlet 65e and the fourth inlet 65i are basically opposite of path other, and that opened/closed states of the fifth outlet 65f and the fifth inlet 65j are basically opposite of path other.

The second valve body 212 and the third valve body 221 are formed such that opened/closed states of the second outlet 66c and the second inlet 66g are basically opposite of path other, that opened/closed states of the third outlet 66d and the third inlet 66h are basically opposite of path other, that opened/closed states of the fourth outlet 66e and the fourth inlet 66i are basically opposite of path other, and that opened/closed states of the fifth outlet 66f and the fifth inlet 66j are basically opposite of path other.

In this way, similar to the above embodiment, the coolant that circulates through the coolant passing device 15, 16, 18, 19 can be switched.

In this embodiment, the first switching valve 65 and the second switching valve 66 may be integrated, and the switching device 60 may be constructed as the single switching valve. For example, a case of the first switching valve 65 and a case of the second switching valve 66 may mechanically be coupled. The case of the first switching valve 65 and the case of the second switching valve 66 may integrally be molded.

Fifth Embodiment

Figure 12:
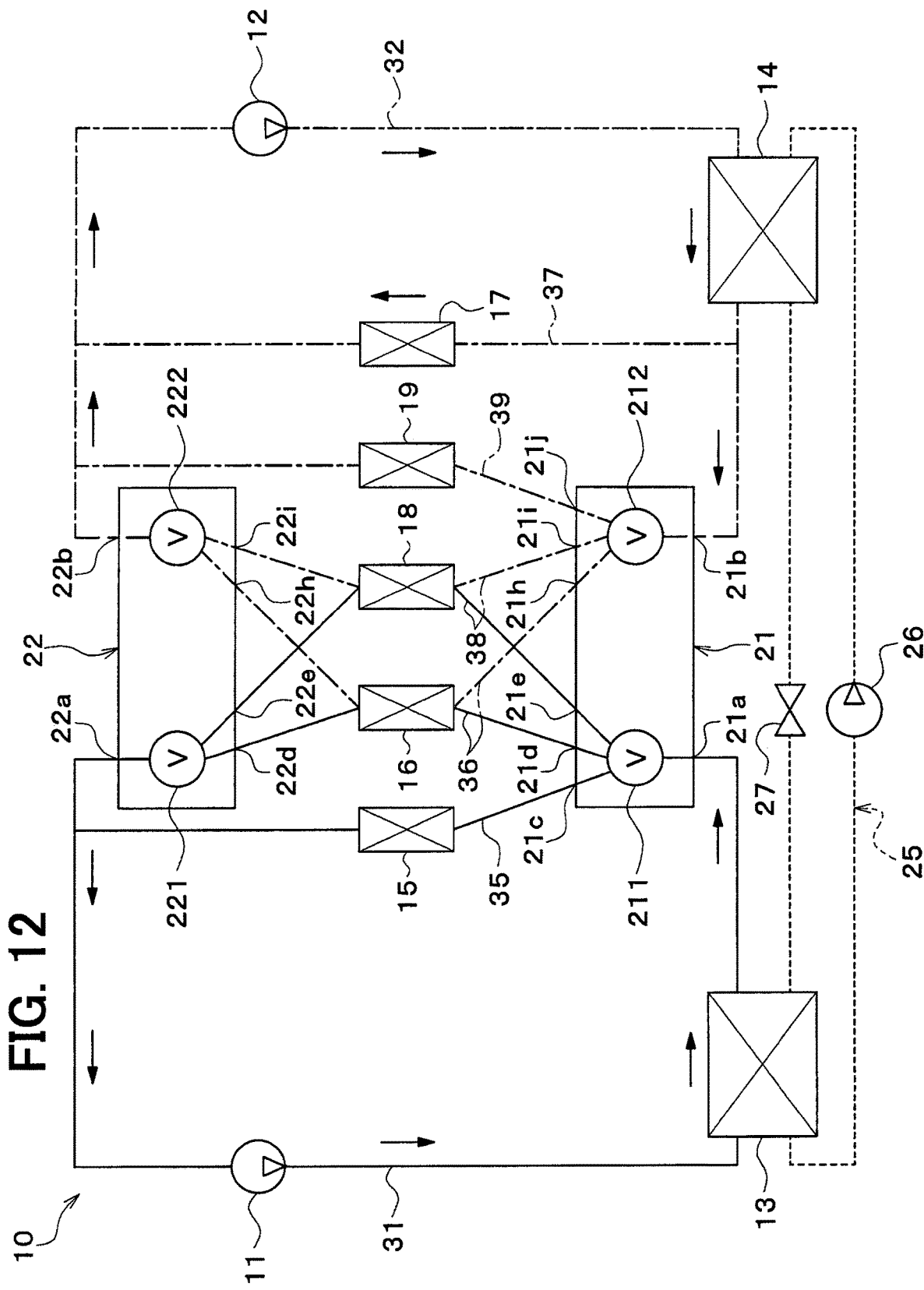
FIG. 12 is an overall configuration diagram illustrating a vehicular heat management system in a fifth embodiment.

In the above first embodiment, the cooler core 15 and the radiator 19 are connected to the first switching valve 21 and the second switching valve 22. However, in this embodiment, as shown in FIG. 12, the cooler core 15 is connected to the coolant suction side of the first pump 11 without being connected to the second switching valve 22, and the radiator 19 is connected to the coolant suction side of the second pump 12 without being connected to the second switching valve 22.

The coolant inlet side of the cooler core 15 is connected to the coolant discharge side of the first pump 11 via the first valve body 211. The coolant outlet side of the cooler core 15 is connected to the coolant suction side of the first pump 11 without interposing the third valve body 221 and the fourth valve body 222. The cooler core 15 is not connected to the second valve body 212, the third valve body 221, the fourth valve body 222, or the second pump 12.

Accordingly, the coolant of the first coolant circuit (i.e., the coolant cooled by the coolant cooler 13) circulates through the cooler core 15, but the coolant of the second coolant circuit (i.e., the coolant heated by the coolant heater 14) is not circulated therethrough.

The first valve body 211 adjusts an opening degree of the first outlet 21c of the first switching valve 21. Thus, a flow rate of the coolant flowing through the cooler core 15 can be adjusted. The coolant can be prevented from flowing through the cooler core 15 when the first valve body 211 closes the first outlet 21c of the first switching valve 21.

The coolant inlet side of the radiator 19 is connected to the coolant discharge side of the second pump 12 via the second valve body 212. The coolant outlet side of the radiator 19 is connected to the coolant suction side of the second pump 12 without interposing the third valve body 221 and the fourth valve body 222. The radiator 19 is not connected to the first valve body 211, the third valve body 221, the fourth valve body 222, or the first pump 11.

Accordingly, the coolant of the second coolant circuit (i.e., the coolant heated by the coolant heater 14) circulates through the radiator 19, but the coolant of the first coolant circuit (i.e., the coolant cooled by the coolant cooler 13) is not circulated therethrough.

The second valve body 212 adjusts an opening degree of the eighth outlet 21j of the first switching valve 21. Thus, a flow rate of the coolant flowing through the radiator 19 can be adjusted. The coolant can be prevented from flowing through the radiator 19 when the second valve body 212 closes the eighth outlet 21j of the first switching valve 21.

In this embodiment, the cooler core 15 and the radiator 19 are a non-switching-target-coolant passing device (i.e., nonswitching-target heating-medium passing device) passing the coolant that circulates between the non-switching-target-coolant passing device and only one of the first pump 11 and the second pump 12.

The non-switching-target-coolant passing device 15, 19 is connected to the coolant discharge side (i.e., the heating medium discharge side) of the one pump via the valve body, which is on the one pump side, of the first valve body 211 and the second valve body 212, and is connected to the coolant suction side (i.e., the heating medium suction side) of the one pump without interposing the third valve body 221 and the fourth valve body 222.

According to the above-described features, the distribution of the coolant to path of the non-switching-target-coolant passing device 15, 19 can be blocked by the one valve body of the first valve body 211 and the second valve body 212.

Sixth Embodiment

Figure 13:
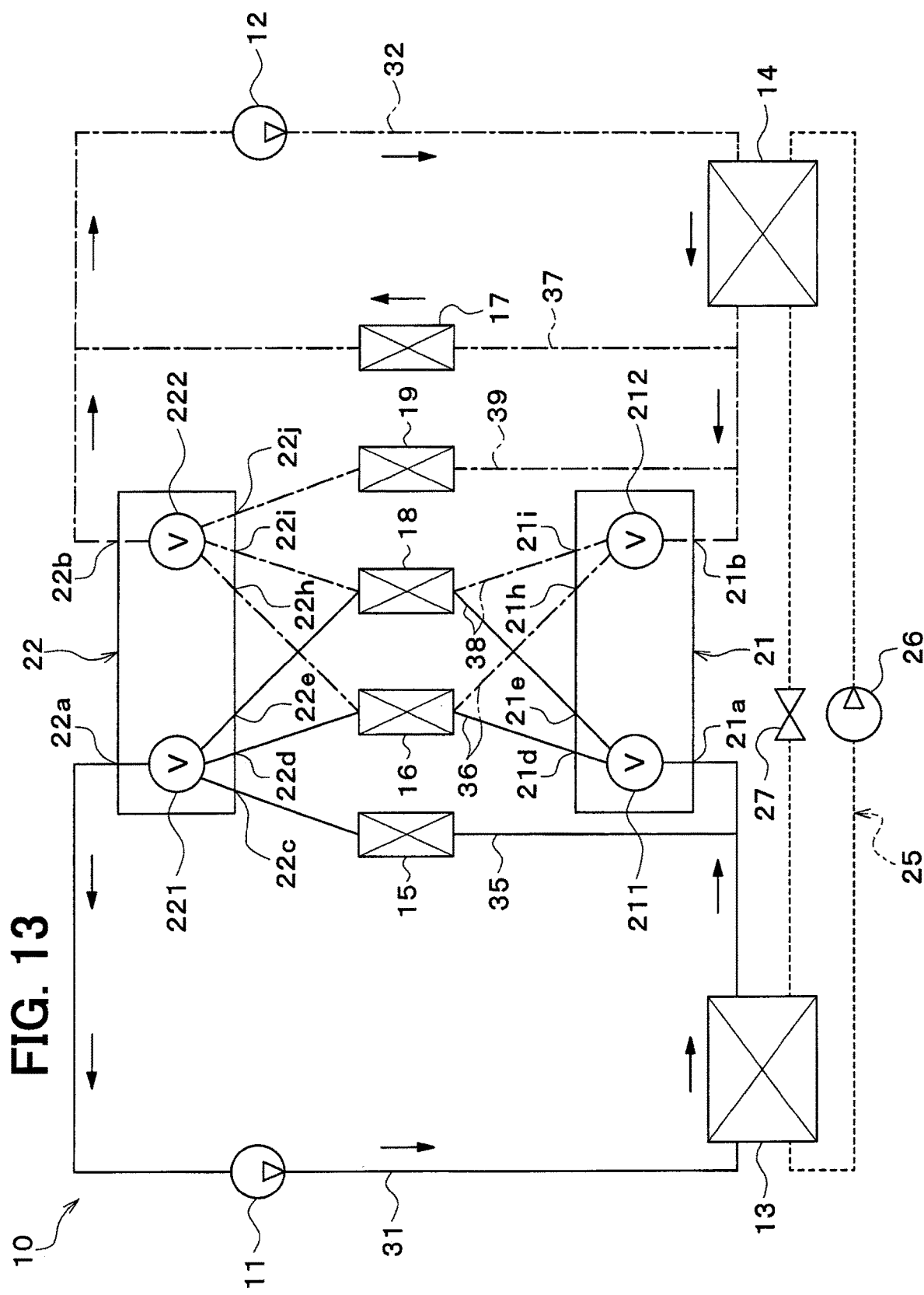
FIG. 13 is an overall configuration diagram illustrating a vehicular heat management system in a sixth embodiment.

In the above fifth embodiment, the cooler core 15 and the radiator 19 are connected to the first switching valve 21 but not connected to the second switching valve 22. However, in this embodiment, as shown in FIG. 13, the cooler core 15 and the radiator 19 are connected to the second switching valve 22 but not connected to the first switching valve 21.

The coolant inlet side of the cooler core 15 is connected to the coolant discharge side of the first pump 11 without interposing the first valve body 211 and the second valve body 212. The coolant outlet side of the cooler core 15 is connected to the coolant suction side of the first pump 11 via the third valve body 221. The cooler core 15 is not connected to the first valve body 211, the second valve body 212, the fourth valve body 222, and the second pump 12.

Accordingly, the coolant of the first coolant circuit (i.e., the coolant cooled by the coolant cooler 13) circulates through the cooler core 15, but the coolant of the second coolant circuit (i.e., the coolant heated by the coolant heater 14) is not circulated therethrough.

The third valve body 221 adjusts an opening degree of the first inlet 22c of the second switching valve 22. Thus, the flow rate of the coolant flowing through the cooler core 15 can be adjusted. The coolant can be prevented from flowing through the cooler core 15 when the third valve body 221 closes the first inlet 22c of the second switching valve 22.

The coolant inlet side of the radiator 19 is connected to the coolant discharge side of the second pump 12 without interposing the first valve body 211 and the second valve body 212. The coolant outlet side of the radiator 19 is connected to the coolant suction side of the second pump 12 via the fourth valve body 222. The radiator 19 is not connected to the first valve body 211, the second valve body 212, the third valve body 221, and the first pump 11.

Accordingly, the coolant of the second coolant circuit (i.e., the coolant heated by the coolant heater 14) circulates through the radiator 19, but the coolant of the first coolant circuit (i.e., the coolant cooled by the coolant cooler 13) is not circulated therethrough.

The fourth valve body 222 adjusts an opening degree of the eighth inlet 22j of the second switching valve 22. Thus, the flow rate of the coolant flowing through the radiator 19 can be adjusted. The coolant can be prevented from flowing through the radiator 19 when the fourth valve body 222 closes the eighth inlet 22j of the second switching valve 22.

In this embodiment, the cooler core 15 and the radiator 19 are the non-switching-target heating-medium passing device passing the coolant that circulates between the non-switching-target heating-medium passing device and only one pump of the first pump 11 and the second pump 12.

The non-switching-target heating-medium passing device 15, 19 is path connected to the coolant discharge side (i.e., the heating medium discharge side) of the one pump without interposing the first valve body 211 and the second valve body 212, and is connected to the coolant suction side (i.e., the heating medium suction side) of the one pump via the valve body on the one pump side of the third valve body 221 and the fourth valve body 222.

According to the above-described features, the distribution of the coolant to path of the non-switching-target-coolant passing device 15, 19 can be blocked by the one valve body of the third valve body 221 and the fourth valve body 222.

Seventh Embodiment

Figure 14:
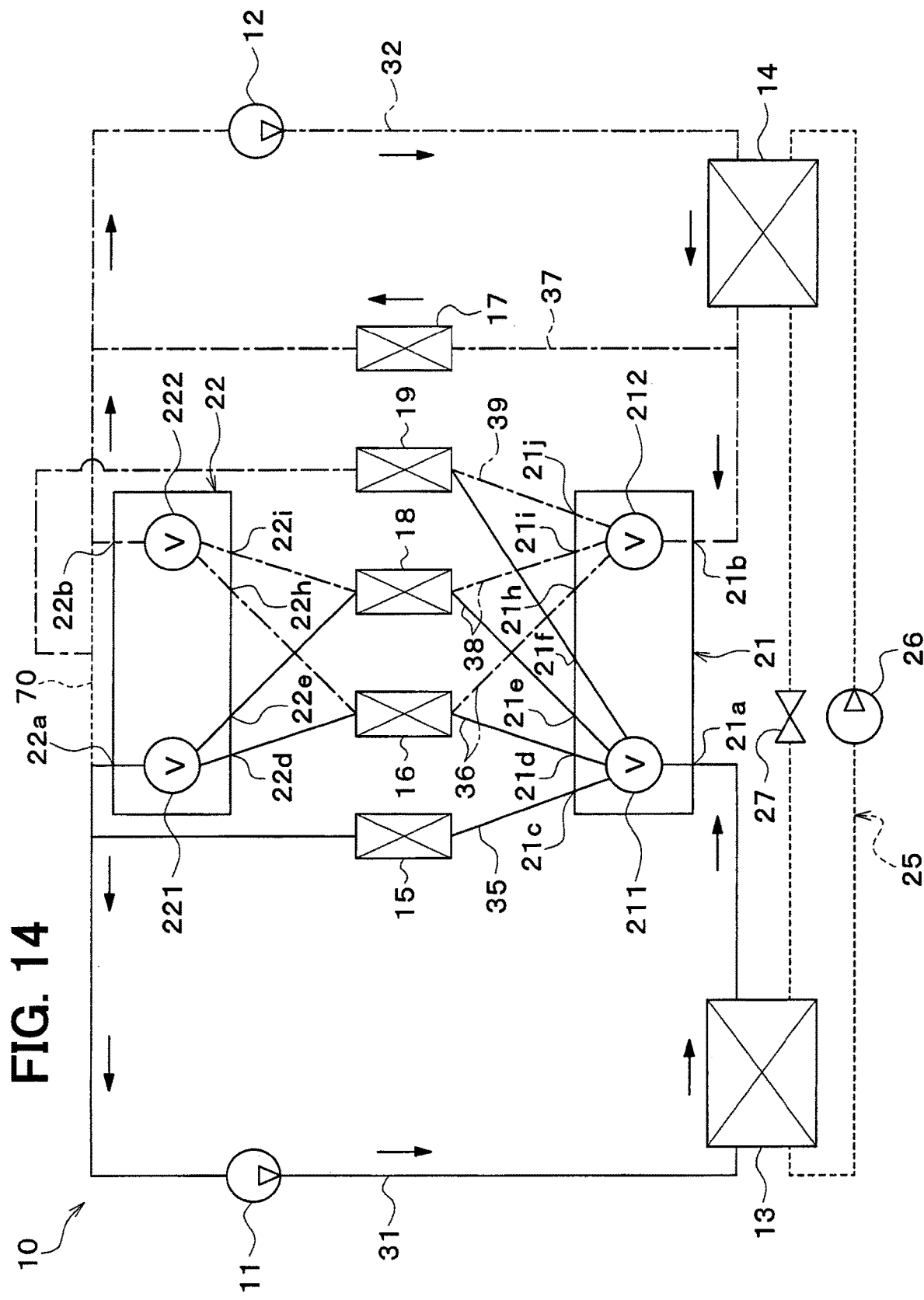
FIG. 14 is an overall configuration diagram illustrating a vehicular heat management system in a seventh embodiment.

In the above first embodiment, the coolant outlet side of the radiator 19 is connected to the second switching valve 22. However, in this embodiment, as shown in FIG. 14, the radiator 19 is connected to the coolant suction side of the first pump 11 and the coolant suction side of the second pump 12 without interposing the second switching valve 22.

An end of the radiator path 39 that is on the coolant outlet side of the radiator 19 is connected to a communication path 70. The communication path 70 is a path for communicating between the first pump path 31 and the second pump path 32.

An end of the communication path 70 is connected to a portion of the first pump path 31 between the second switching valve 62 and the first pump 11. The other end of the communication path 70 is connected to a portion of the second pump path 32 between the second switching valve 62 and the second pump 12.

The communication path 70 constitutes a branch passage that divides the radiator path 39 into the first pump path 31 side and the second pump path 32 side. The communication path 70 may be formed on the inside the second switching valve 22.

When the first switching valve 21 connects the radiator path 39 to the first pump path 31 side, the coolant after flowing through the radiator path 39 flows into the first pump path 31 but does not flow into the second pump path 32.

That is, a circuit through which the coolant circulates is formed between the radiator path 39 and the first pump path 31. However, a circuit through which the coolant circulates is not formed between the radiator path 39 and the second pump path 32. Thus, a constant flow of the coolant from the radiator path 39 to the second pump path 32 never occurs.

When the first switching valve 21 connects the radiator path 39 to the second pump path 32 side, the coolant after flowing through the radiator path 39 flows into the second pump path 32 but does not flow into the first pump path 31.

That is, the circuit through which the coolant circulates is formed between the radiator path 39 and the second pump path 32. However, the circuit through which the coolant circulates is not formed between the radiator path 39 and the first pump path 31. Thus, a constant flow of the coolant from the radiator path 39 to the first pump path 31 never occurs.

In this embodiment, the radiator path 39 is connected to the communication path 70 and the first switching valve 21. In this way, the radiator path 39 is unnecessary to be connected to the second switching valve 22. Thus, a quantity of the coolant outlets (i.e., a quantity of ports) of the second switching valve 22 can be reduced, and thus the configuration of the second switching valve 22 can be simplified.

In this embodiment, the radiator 19 is switching-target-coolant passing device (i.e., switching-target heating-medium passing device) of which state (i) that the coolant circulates between the radiator 19 and the first pump 11 and (ii) that the coolant circulates between the radiator 19 and the second pump 12 are switched by the first valve body 211 and the second valve body 212.

The switching-target-coolant passing device 19 is connected to the coolant discharge side of the first pump 11 via the first valve body 211, is connected to the coolant discharge side (i.e., the heating medium discharge side) of the second pump 12 via the second valve body 212, and is connected to the coolant suction side of the first pump 11 and the coolant suction side (i.e., the heating medium suction side) of the second pump 12 without interposing the third valve body 221 and the fourth valve body 222.

According to the above-described features, the switching-target-coolant passing device 19 is unnecessary to be connected to the third valve body 221 and the fourth valve body 222, and thus the configuration can be simplified.

Other Embodiments

The above embodiments can appropriately be combined. For example, various modifications can be made to the above embodiments as follows.

(1) In the above embodiments, a quantity of the coolant passing device that is connected to the first switching valves 21, 61, 63, 65 and the second switching valves 22, 62, 64, 66 can appropriately increase or decrease.

(2) In the above embodiments, the coolant is used as the heating medium. However, any of various types of media, such as oil, can be used as the heating medium.

The nano fluid may be used as the heating medium. The nano fluid is a fluid in which nanoparticles with particle diameters of nanometer order are mixed. In addition to an operational effect in lowering a freezing point like the coolant (so-called the antifreeze liquid) using ethylene glycol, the following operational effects can be obtained by mixing the nanoparticles in the heating medium.

That is, an operational effect in improving thermal conductivity in a particular temperature range, an operational effect in increasing heat capacity of the heating medium, an anticorrosive effect of a metal pipe and an operational effect in preventing deterioration of a rubber pipe, and an operational effect in increasing fluidity of the heating medium at an extremely low temperature can be obtained.

Such operational effects change variously in accordance with a particle configuration, a particle shape, a compounding ratio, and an additive material of the nanoparticle.

According to the above-described features, the thermal conductivity can be improved. Thus, the equivalent cooling efficiency can be obtained even by using the heating medium in a smaller amount than the coolant using ethylene glycol.

In addition, the heat capacity of the heating medium can be increased. Thus, a cold heat storage quantity (i.e., stored cold heat by the sensible heat) of the heating medium itself can be increased.

Even in a state that the compressor 26 is not actuated, the temperature adjustment that includes cooling and heating of the device by using the stored cold heat can be performed for a certain duration by increasing the cold heat storage quantity. Thus, the power of the vehicular heat management system 10 can be saved.

An aspect ratio of the nanoparticle is preferably 50 or more. In this way, the sufficient thermal conductivity can be obtained. It should be noted that the aspect ratio is a shape index that represents a ratio of vertical and horizontal lengths of the nanoparticle.

As the nanoparticle, a nanoparticle that contains any of Au, Ag, Cu, and C can be used. More specifically, as a constituent atom of the nanoparticle, an Au nanoparticle, an Ag nanowire, a carbon nanotube (i.e., a CNT), graphene, a graphite core-shell structured nanoparticle (i.e., a nanoparticle in which a structure such as a carbon nanotube is present to surround the above atom), and an Au nanoparticle containing CNT, or the like can be used.

(3) In the refrigeration cycle 25 of the above embodiments, the chlorofluorocarbon-based refrigerant is used as the refrigerant. However, a type of the refrigerant is not limited to the above, and a natural refrigerant such as carbon dioxide, a hydrocarbon-based refrigerant, or the like may be used.

In addition, the refrigeration cycle 25 of the above embodiments constitutes the subcritical refrigeration cycle in which the pressure of the high-pressure side refrigerant does not exceed the critical pressure of the refrigerant. However, the refrigeration cycle 25 may constitute a supercritical refrigeration cycle in which the pressure of the high-pressure side refrigerant exceeds the critical pressure of the refrigerant.

(4) In the above embodiments, the example in which the vehicular heat management system 10 is applied to the hybrid vehicle is described. However, the vehicular heat management system 10 may be applied to an electric vehicle that does not include the engine and obtains the drive power for running the vehicle from the electric motor for travel, a fuel cell powered vehicle that travels by obtaining electric power through a reaction of hydrogen and oxygen, and the like.

What is claimed is:
1. A vehicular heat management system comprising:
a first pump and a second pump drawing and discharging a heating medium;
more than or equal to three of heating medium passing devices in which the heating medium flows; and
a switching section switching a flow of the heating medium with respect to the more than or equal to three of heating medium passing devices, wherein
the switching section has a first valve body, a second valve body, a third valve body, and a fourth valve body,
each of the more than or equal to three of heating medium passing devices is directly connected to the first and second valve bodies at a position downstream of the first and second valve bodies through first and second paths, respectively, and is directly connected to the third and fourth valve bodies at a position upstream of the third and fourth valve bodies through third and fourth paths, respectively,
the first pump is positioned upstream of the first valve body and downstream of the third valve body,
the second pump is positioned upstream of the second valve body and downstream of the fourth valve body,
the first valve body switching a state that the heating medium discharged from the first pump flows in and a state that the heating medium discharged from the first pump does not flow in, with respect to the more than or equal to three of heating medium passing devices,
the second valve body switching a state that the heating medium discharged from the second pump flows in and a state that the heating medium discharged from the second pump does not flow in, with respect to the more than or equal to three of heating medium passing devices, the third valve body switching a state that the heating medium flows to the first pump and a state that the heating medium does not flow to the first pump, with respect to the more than or equal to three of heating medium passing devices, and the fourth valve body switching a state that the heating medium flows to the second pump and a state that the heating medium does not flow to the second pump, with respect to the more than or equal to three of heating medium passing devices.

2. The vehicular heat management system according to claim 1, the vehicular heat management system further comprising a first-pump-side valve body chamber that houses the first valve body and the third valve body, and a second-pump-side valve body chamber that houses the second valve body and the fourth valve body, wherein the first-pump-side valve body chamber and the second-pump-side valve body chamber are formed separately from each other.

3. The vehicular heat management system according to claim 1, wherein the switching section is constructed of one switching valve that houses the first valve body, the second valve body, the third valve body, and the fourth valve body.

4. The vehicular heat management system according to claim 1, wherein two valve bodies of the first valve body, the second valve body, the third valve body, and the fourth valve body are mechanically coupled to each other.

5. The vehicular heat management system according to claim 4, wherein remaining two of the first valve body, the second valve body, the third valve body, and the fourth valve body are mechanically coupled to each other.

6. The vehicular heat management system according to claim 1, wherein the first valve body and the third valve body are mechanically coupled to each other.

7. The vehicular heat management system according to claim 6, wherein the second valve body and the fourth valve body are mechanically coupled to each other.

8. The vehicular heat management system according to claim 1, wherein the first valve body and the second valve body are mechanically coupled to each other.

9. The vehicular heat management system according to claim 8, wherein the third valve body and the fourth valve body are mechanically coupled to each other.

10. The vehicular heat management system according to claim 1, wherein the first valve body and the fourth valve body are mechanically coupled to each other.

11. The vehicular heat management system according to claim 10, wherein the second valve body and the third valve body are mechanically coupled to each other.

12. A vehicular heat management system comprising:

a first pump and a second pump drawing and discharging a heating medium;

more than three of heating medium passing devices in which the heating medium flows; and a switching section switching a flow of the heating medium with respect to the more than three of heating medium passing devices, wherein the switching section has a first valve body, a second valve body, a third valve body, and a fourth valve body, a first one of the more than three of heating medium passing devices is positioned downstream of the first valve body and is fluidly connected to a discharging side of the first pump through the first valve body and to a suction side of the first pump without the first to fourth valve bodies, a second one of the more than three of heating medium passing devices is positioned downstream of the second valve body and is fluidly connected to a discharging side of the second pump through the second valve body and to a suction side of the second pump without the first to fourth valve bodies, remaining ones of the more than three of heating medium passing devices are positioned downstream of the first and second valve bodies and upstream of the third and fourth valve bodies and are fluidly connected to the discharging side of the first pump through the first valve body, to the suction side of the first pump through the third valve body, to the discharging side of the second pump through the second valve body, and to the suction side of the second pump through the fourth valve body, the first valve body switching a state that the heating medium discharged from the first pump flows in and a state that the heating medium discharged from the first pump does not flow in, with respect to the first one and the remaining ones of the more than three of heating medium passing devices, the second valve body switching a state that the heating medium discharged from the second pump flows in and a state that the heating medium discharged from the second pump does not flow in, with respect to the second one and the remaining ones of the more than three of heating medium passing devices, the third valve body switching a state that the heating medium flows to the first pump and a state that the heating medium does not flow to the first pump, with respect to the remaining ones of the more than three of heating medium passing devices, and the fourth valve body switching a state that the heating medium flows to the second pump and a state that the heating medium does not flow to the second pump, with respect to the remaining ones of the more than three of heating medium passing devices.

13. A vehicular heat management system comprising:

a first pump and a second pump drawing and discharging a heating medium;

more than three of heating medium passing devices in which the heating medium flows; and a switching section switching a flow of the heating medium with respect to the more than three of heating medium passing devices, wherein the switching section has a first valve body, a second valve body, a third valve body, and a fourth valve body, a first one of the more than three of heating medium passing devices is positioned upstream of the third valve body and is fluidly connected to a suction side of the first pump through the third valve body and to a discharging side of the first pump without the first to fourth valve bodies, a second one of the more than three of heating medium passing devices is positioned upstream of the fourth valve body and is fluidly connected to a suction side of the second pump through the fourth valve body and to a discharging side of the second pump without the first to fourth valve bodies, remaining ones of the more than three of heating medium passing devices are positioned downstream of the first and second valve bodies and upstream of the third and fourth valve bodies and are fluidly connected to the discharging side of the first pump through the first valve body, to the suction side of the first pump through the third valve body, to the discharging side of the second pump through the second valve body, and to the suction side of the second pump through the fourth valve body, the first valve body switching a state that the heating medium discharged from the first pump flows in and a state that the heating medium discharged from the first pump does not flow in, with respect to the remaining ones of the more than three of heating medium passing devices, the second valve body switching a state that the heating medium discharged from the second pump flows in and a state that the heating medium discharged from the second pump does not flow in, with respect to the remaining ones of the more than three of heating medium passing devices, the third valve body switching a state that the heating medium flows to the first pump and a state that the heating medium does not flow to the first pump, with respect to the first one and the remaining ones of the more than three of heating medium passing devices, and the fourth valve body switching a state that the heating medium flows to the second pump and a state that the heating medium does not flow to the second pump, with respect to the second one and the remaining ones of the more than three of heating medium passing devices.

14. A vehicular heat management system comprising:

a first pump and a second pump drawing and discharging a heating medium;

more than or equal to three of heating medium passing devices in which the heating medium flows; and a switching section switching a flow of the heating medium with respect to the more than or equal to three of heating medium passing devices, wherein the switching section has a first valve body, a second valve body, a third valve body, and a fourth valve body, at least two of the more than or equal to three of heating medium passing devices are positioned downstream of the first and second valve bodies and are directly connected to the first and second valve bodies through first and second paths, respectively, and are directly connected to the third and fourth valve bodies at a position upstream of the third and fourth valve bodies through third and fourth paths, respectively, one of the more than or equal to three of heating medium passing devices is positioned downstream of the first and second valve bodies and is directly connected to the first and second valve bodies through the first and second paths, respectively, to a discharging side of the first pump through the first valve body and the first path, to a suction side of the first pump through a fifth path, to a discharging side of the second pump through the second valve body and the second path, and to a suction side of the second pump through the fifth path, the first valve body switching a state that the heating medium discharged from the first pump flows in and a state that the heating medium discharged from the first pump does not flow in, with respect to the more than or equal to three of heating medium passing devices, the second valve body switching a state that the heating medium discharged from the second pump flows in and a state that the heating medium discharged from the second pump does not flow in, with respect to the more than or equal to three of heating medium passing devices, the third valve body switching a state that the heating medium flows to the first pump and a state that the heating medium does not flow to the first pump, with respect to remaining ones of the more than or equal to three of heating medium passing devices, and the fourth valve body switching a state that the heating medium flows to the second pump and a state that the heating medium does not flow to the second pump, with respect to the remaining ones of the more than or equal to three of heating medium passing devices.

* * * * *